United States Patent [19]
Konishi et al.

[11] Patent Number: 6,163,521
[45] Date of Patent: Dec. 19, 2000

[54] DISK HAVING READ-ONLY AND READ-WRITE AREAS

[75] Inventors: Shinichi Konishi, Nara; Fumiaki Ueno, Kyoto, both of Japan

[73] Assignee: Matsushita Electric Industrial Co., Ltd., Osaka, Japan

[21] Appl. No.: 09/059,191

[22] Filed: Apr. 13, 1998

[30] Foreign Application Priority Data

Apr. 16, 1997 [JP] Japan ................................. 9-098809

[51] Int. Cl.[7] ..................................................... G11B 7/00
[52] U.S. Cl. ......................................................... 369/275.3
[58] Field of Search ............................. 369/275.3, 275.4, 369/275.1, 44.26, 47, 48, 49, 50, 54, 58

[56] References Cited

U.S. PATENT DOCUMENTS

| | | | |
|---|---|---|---|
| 5,204,852 | 4/1993 | Nakagawa et al. | 369/275.1 |
| 5,373,498 | 12/1994 | Tagiri | 369/275.3 |
| 5,568,467 | 10/1996 | Inagaki et al. | 369/275.3 |
| 5,592,452 | 1/1997 | Yoshimoto et al. | 369/58 |

FOREIGN PATENT DOCUMENTS

| | | |
|---|---|---|
| 0294489 | 12/1988 | European Pat. Off. . |
| 0544017 | 6/1993 | European Pat. Off. . |
| 0570235 | 11/1993 | European Pat. Off. . |
| 0752701 | 1/1997 | European Pat. Off. . |
| 0762398 | 3/1997 | European Pat. Off. . |
| 06084284 | 3/1994 | Japan . |
| 07262605 | 10/1995 | Japan . |
| 08022640 | 1/1996 | Japan . |

OTHER PUBLICATIONS

International Search Report for Application No. PCT/JP98/01732; Dated Dec. 17, 1998.

Primary Examiner—Paul W. Huber
Attorney, Agent, or Firm—Renner, Otto, Roisselle & Sklar LLP

[57] ABSTRACT

A disk of the present invention includes a first storage area for reproducing data and a second storage area for recording and reproducing data, the number of sectors in each track in the first and second storage areas close to each other is larger in the first storage area than in the second storage area, and leading edges of sectors in each track in the first storage area are aligned in at least one line in a radius direction.

14 Claims, 21 Drawing Sheets

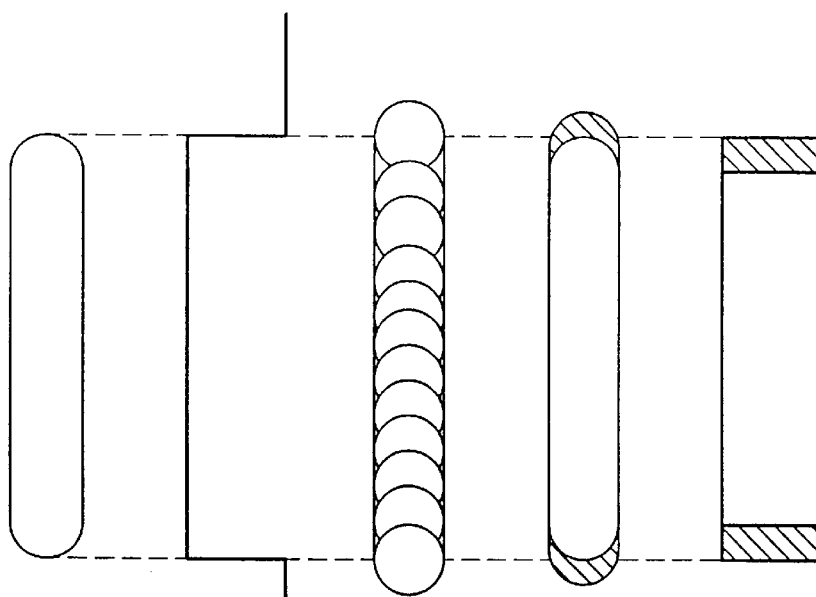
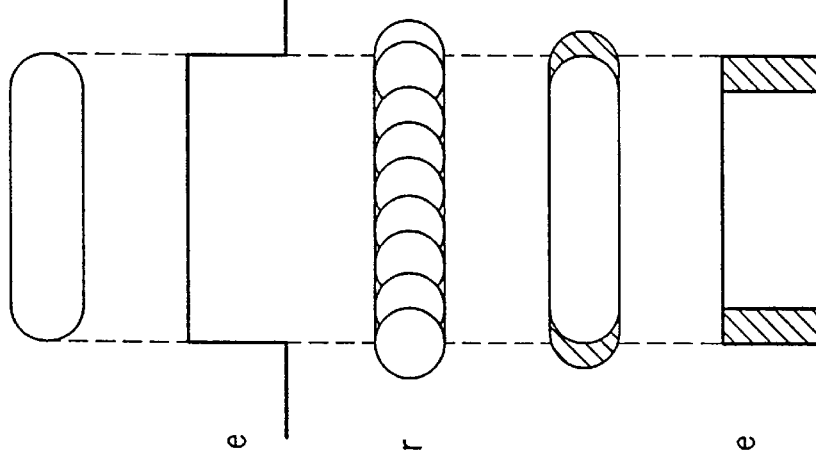
FIG. 18(a) Desired pits
FIG. 18(b) Recording pulse
FIG. 18(c) Recording laser spot
FIG. 18(d) Mark to be obtained
FIG. 18(e) Recording pulse with duty corrected

DISK HAVING READ-ONLY AND READ-WRITE AREAS

BACKGROUND OF THE INVENTION

1. Field of the Invention

The present invention relates to a disk having a recordable and reproducible area and an area in which fixed information dedicated to reproduction is recorded, and a disk recording apparatus which performs recording onto the disk.

2. Description of the Related Art

In recent years, due to the ability to hold a large capacity of data, an optical disk capable of recording information has been becoming important for accumulating audio data, video data, and various information equipment data. Under this circumstance, there is a demand for a larger capacity of an optical disk. In order to meet this demand, the density of recorded information on an optical disk needs to be increased. The information density on an optical disk is determined by a pitch of an information track and an information density in a track direction (i.e., linear density of information). Thus, in order to improve the information density on an optical disk, it is required to narrow a track pitch and increase a linear density.

An optical disk can be used for various purposes. For example, in the case of using an optical disk as a medium for supplying software such as an operating system and a basic dictionary or software for games, if a read-only optical disk is produced in such a manner that data is recorded in the form of concave or convex pits, optical disks can be replicated in large quantity at low cost.

On the other hand, there is a demand that a user can append or write desired data to read-only data recorded by a software supplier in accordance therewith. Thus, in order to meet this demand, it is required that one optical disk has an area in which read-only data is recorded and a recordable and reproducible area.

In the case of providing the above-mentioned two areas in one optical disk for recording/reproduction, read-only data is previously recorded on concave grooves and convex tracks before shipping, and this recorded area may be used only for reproducing data. In this case, read-only data is required to be recorded onto each disk, which is a time-consuming task and increases cost.

In order to solve this problem, an optical disk has been proposed, in which required data is recorded in an area of the optical disk in the form of concave or convex pits, and the remaining area is made recordable (e.g., Japanese Laid-open Publication No. 63-20769). In this case, it is not required to record required data on each disk, which allows mass-production of optical disks by, for example, injection, resulting in a decrease in cost.

The most popular disk as a ROM disk is a CD or is DVD-ROM disk. In these disks, in order to achieve a large capacity, concave or convex pits are continuously recorded at a constant linear speed for tracing tracks. Needless to say, data is also required to be reproduced by rotating a disk at a constant linear speed.

In the case of constructing a disk having a ROM portion and a RAM portion, a format of the ROM portion should be made identical with that of a CD or a DVD-ROM disk for the following reason: when a disk having a ROM portion and a RAM portion is mistakenly inserted into a drive device which only reads data from a CD or a DVD-ROM disk, if the format of the ROM portion is identical with that of a CD or a DVD-ROM, the drive device can recognize the mistakenly inserted disk.

Now, a method for reproducing data from a CD or a DVD-ROM disk by a drive device will be described.

As for reproduction of the above-mentioned disk, a pick-up head is moved to an area called a lead-in, and information called control data required for reproducing the disk is read. The procedure to the time when information starts being read is as follows.

First, a disk surface is focused by controlling the position of a lens of the pick-up head. Secondly, tracking is performed so that pit strings are continuously read by controlling a traverse mechanism and the lens. Thirdly, a particular period (e.g., the longest interval) of a reproduction signal input to a reproduction circuit is detected, and a rotation speed of a motor is controlled. Fourthly, when rotation variations are stopped, and a signal becomes able to be reproduced at a constant linear speed, a clock synchronized with the reproduction signal is generated, and data is read on the basis of the clock.

However, in the disk having a RAM portion and a ROM portion in which concave or convex pits are continuously recorded at a constant linear speed as described above, a number of operations are required to be performed successively during boot-up of the disk before data is read. Thus, such a disk has a disadvantage of a long boot-up time.

Furthermore, the ROM portion is recorded by a short wavelength cutting machine, so that the linear density can be made higher, compared with that of the RAM portion.

In contrast, the RAM portion has an area in which data is recorded and an area in which data is not recorded, and a sector ID is composed of pre-pits generally called a header. In the header, in addition to address information, a VFO signal for assisting an operation of a PLL (phase-locked loop) circuit, an address mark which is a synchronization signal of address information, etc. are placed, whereby the redundancy of the RAM portion is higher than that of the ROM portion.

However, in a conventional optical disk such as a CD or a DVD-ROM disk, the number of sectors included in one track of the ROM portion is equal to that included in one track of the RAM portion. In this case, the sector format of the ROM portion is identical with that of the RAM portion with high redundancy, so that the recording density of the ROM portion cannot be made high.

Furthermore, in a conventional optical disk, the number of sectors included in one track is equal from an inner track to an outer track in the RAM portion, so that the recording density is lower in the outer track than in the inner track, and the recording density cannot be made high.

SUMMARY OF THE INVENTION

A disk of the present invention includes: a first storage area for reproducing data; and a second storage area for recording end reproducing data, the first storage area being close to the second storage area, wherein the number of sectors in each track of the first storage area and the second storage area close to each other is larger in the first storage area than in the second storage area, and leading edges of the sectors in each track of the first storage area are aligned in at least one line.

In one embodiment, the leading edge of each sector in the first storage area and the leading edge of each sector in the second storage area are aligned in at least one line in a radius direction.

In one embodiment, a portion in which data is not recorded is placed between the first storage area and the second storage area.

In one embodiment, addresses are continuously provided to the first and second storage areas.

In one embodiment, information indicating a boundary position between the first storage area and the second storage area is recorded in a backup data portion in the first storage area.

A disk of the present invention includes: a first storage area for reproducing data; and a second storage area for recording and reproducing data, wherein the second storage area is divided into a plurality of zones, and the number of sectors in each zone on an inner side of the disk is smaller, and leading edges of sectors in each track in the first storage area are radially arranged.

In one embodiment, the number of tracks in each zone in the second storage area is equal to each other.

In one embodiment, the leading edge of each sector in the first storage area and the leading edge of each sector in the second storage area are aligned in at least one line in a radius direction.

In one embodiment, a portion in which data is not recorded is placed between the first storage area and the second storage area.

In one embodiment, addresses are continuously provided to the first and second storage areas.

In one embodiment, information indicating a boundary position between the first storage area and the second storage area is recorded in a backup data portion in the first storage area.

In one embodiment, the first storage area includes a backup data portion and a user data portion, all leading edges of the respective sectors are radially arranged in the backup data portion, the user data portion is divided into a plurality of zones, and the leading edges of the respective sectors are radially arranged in each zone of the user data portion, the second storage area is divided into a plurality of zones, and the leading edges of the respective sectors are radially arranged in each zone of the second storage area, and the number of tracks in each zone of the first and second storage areas is equal to each other.

In one embodiment, an address of a leading sector in each zone is determined in accordance with a position in a radius direction of the leading sector.

A disk recording apparatus of the present invention includes: a light source for irradiating a master optical disk having a first storage area for reproducing data and a second storage area for recording and reproducing data; a light beam splitter for splitting a light beam from the light source into a first light beam for forming pits in the first storage region and a second light beam for forming grooves and headers in the second storage area; a first light modulator for modulating the first light beam for forming the pits in the first storage area; a first controller for controlling the first light modulator based on recording data; a second light modulator for modulating the second light beam for forming the grooves and the headers in the second storage area; a second controller for controlling the second light modulator based on the recording data; a light beam deflector for deflecting the second light beam output from the second light modulator at a right angle of a track direction; a light beam deflection controller for controlling the light beam deflector; a first beam shaping unit for shaping the first light beam from the first light modulator; a second beam shaping unit for shaping the second light beam from the light beam deflector; a light beam combining unit for matching an optical axis of the first light beam from the first beam shaping unit with an optical axis of the second light beam from the second beam shaping unit; an objective lens for receiving a light beam from the light beam combining unit and condensing the light beam onto the master optical disk; a motor for rotating the master optical disk; a motor controller for controlling the motor; and a timing controller for controlling a timing of the first and second controller and the light beam deflection controller, based on one rotation synchronization signal from the motor controller, wherein the first controller generates a recording signal so that leading edges of respective sectors in the first storage area are radially arranged, and the recording signal controls the first light modulator.

In one embodiment, the second controller decreases a recording power of a light beam when recording pits showing address information, compared with the recording power of the light beam when recording grooves.

In one embodiment, the first and second controllers independently control an ON/OFF duty ratio of recording data.

In one embodiment, the first controller controls an ON/OFF duty ratio of recording data to be input in each zone when the first storage area is divided into a backup data portion and a user data portion, and the second controller controls an ON/OFF duty ratio of recording data in each zone.

In one embodiment, the light beam deflector deflects the second light beam by about a half track in an outer track direction with respect to a first half of one lump of data formed of pits containing address information which is a header, deflects the second light beam by about a half track in an inner track direction with respect to a second half of the data, and periodically allows the second light beam to wobble when the second light beam traverses the grooves.

A disk recording apparatus of the present invention includes: a light source which forms pits in a first storage area for reproducing data and forms grooves and headers in a second storage area for recording and reproducing data in a master optical disk; a light modulator for modulating a light beam from the light source; a light modulation controller for controlling the light modulator based on recording data; a light beam deflector for deflecting a light beam from the light modulator at a right angle of a track direction; a light beam deflection controller for controlling the light beam deflector; a beam shaping unit for shaping a light beam from the light beam deflector; an aperture diaphragm for switching an aperture limit of a light beam from the beam shaping unit between the first storage area and the second storage area; an objective lens for condensing a light beam from the aperture diaphragm onto the master optical disk; a motor for rotating the master optical disk; a motor controller for controlling the motor; and a timing controller for controlling a timing of the light modulating controller and the light beam deflection controller, based on one rotation synchronization signal from the motor controller, wherein the light modulation controller generates a recording signal so that leading edges of respective sectors in the first storage area are radially arranged, and the recording signal controls the light modulator.

In one embodiment, the light modulation controller decreases a recording power of a light beam when recording the first storage area, compared with when recording the second storage area, and decreases a recording power of a light beam when recording pits containing address information in the second storage area, compared with when recording grooves in the second storage area.

In one embodiment, the light modulation controller controls an ON/OFF duty ratio of recording data in the first and second storage areas independently.

In one embodiment, the light source controller controls an ON/OFF duty ratio of recording data to be recorded in the second storage area in each zone.

In one embodiment, the light beam deflector deflects the light beam by about a half track in an outer track direction with respect to a first half of one lump of data composed of pits containing address information which is a header in the second storage portion, deflects the light beam by about a half track in an inner track direction with respect to a second half of the data, and periodically allows the light beam to wobble when the light beam traverses the grooves.

In one embodiment, the aperture diaphragm switches an aperture limit between the groove and the header in the second storage area.

Thus, the invention described herein makes possible the advantage of providing a disk in which a boot-up time is shortened by contriving a format of the disk and which has a large capacity of ROM portion and RAM portion, and a disk recording apparatus for cutting the disk.

This and other advantages of the present invention will become apparent to those skilled in the art upon reading and understanding the following detailed description with reference to the accompanying figures.

BRIEF DESCRIPTION OF THE DRAWINGS

FIGS. 18(a) through 18(e) are timing diagrams illustrating the necessity of duty ratio correction.

DESCRIPTION OF THE PREFERRED EMBODIMENTS

Hereinafter, an optical disk of the present invention will be described with reference to the drawings.

Embodiment 1

Figure 1:
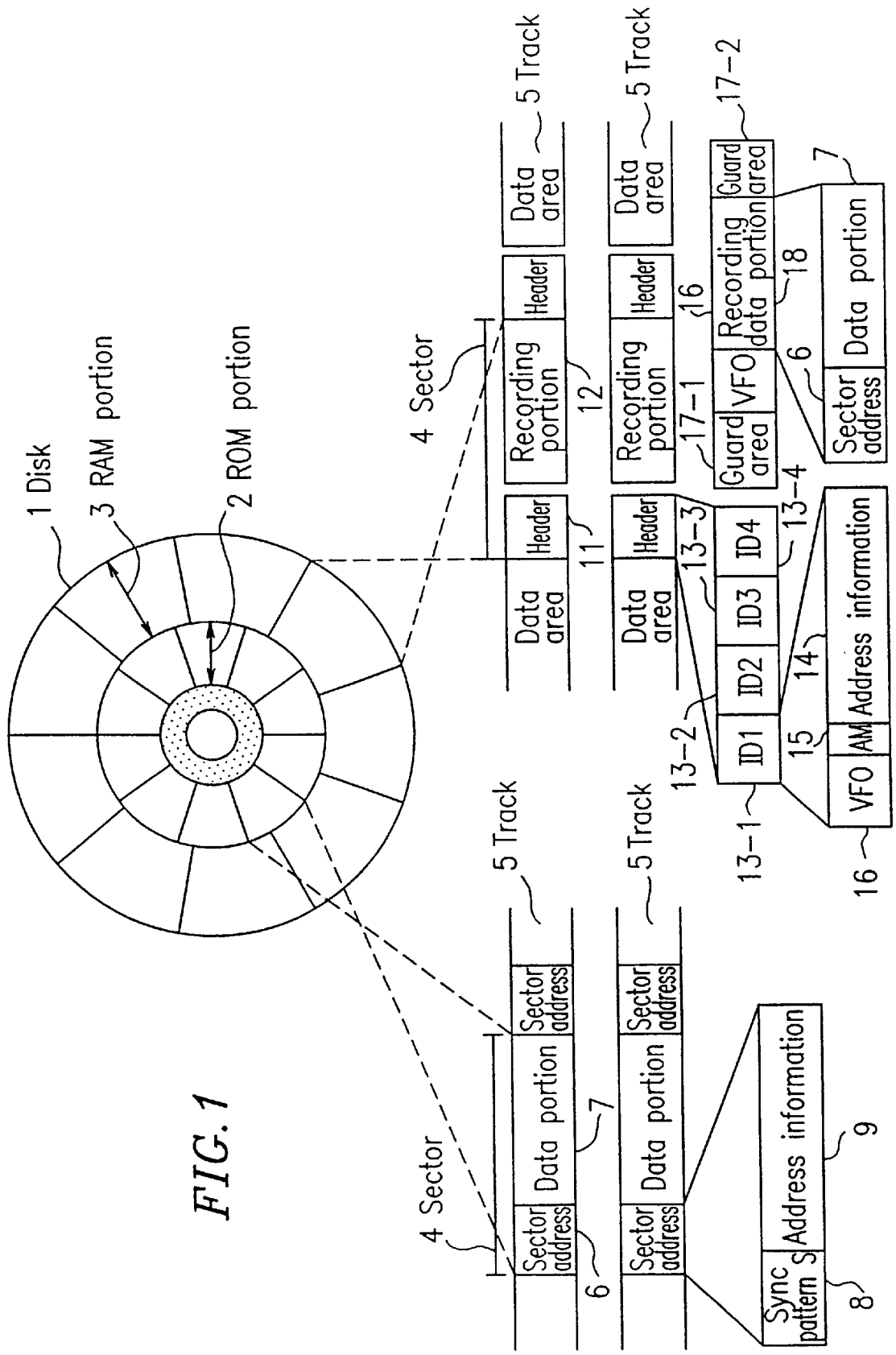
FIG. 1 is a schematic diagram of an optical disk in the first embodiment of the present invention.

FIG. 1 is a schematic diagram of an optical disk having a ROM portion and a RAM portion, showing a configuration of a sector format in the first embodiment of the present invention. A disk 1 shown in FIG. 1 includes a ROM portion on an inner track side and a RAM portion on an outer track side, and all the leading edges of sectors in the ROM portion 2 are radially arranged. Furthermore, the ROM portion 2 forms a backup data portion or a user data portion.

Figure 2:
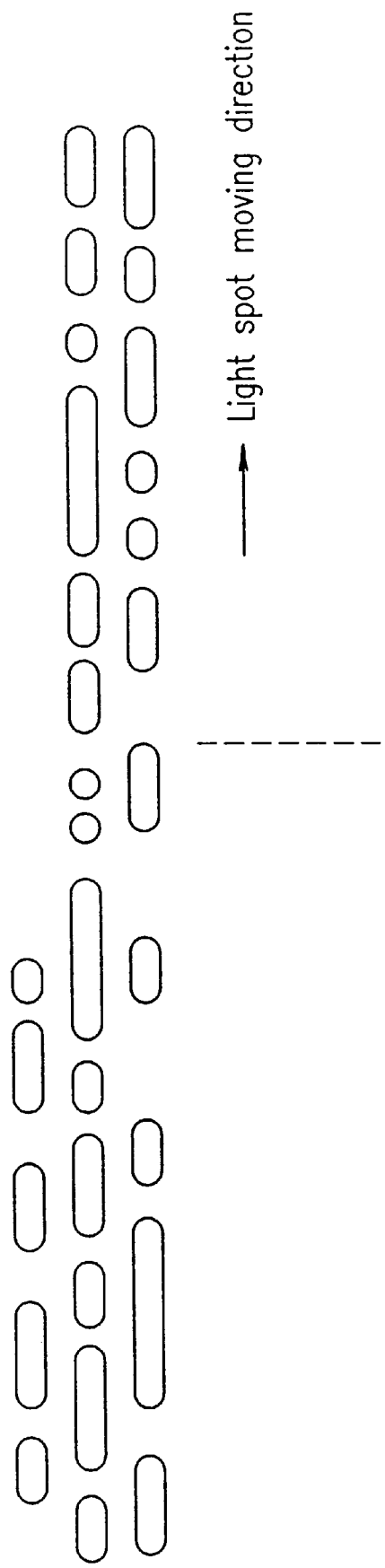
FIG. 2 is a diagram showing a physical configuration of a ROM portion of an optical disk in the first embodiment of the present invention.

FIG. 2 is a diagram showing a physical surface configuration of the ROM portion 2. As shown in FIG. 2, the ROM portion 2 is composed of concave or convex pits. As shown in FIG. 1, a sector 4 of the ROM portion 2 is composed of a sector address 6 and a data portion 7, and information administering a position of a data block is recorded in the sector address 6. When the disk 1 is reproduced, a pick-up head of a disk recording/reproducing apparatus does seeks (moves in a radius direction) in accordance with the sector address 6, whereby desired information is obtained. In order to search for the sector address 6, a particular burst pattern which is not present in data, generally called a sync pattern S 8, is placed at the leading edge of the sector address 6, and a signal of the sync pattern S 8 is detected and synchronized with a clock signal of the apparatus, whereby the sector address 6 is obtained.

Each sector of the RAM portion 3 includes a header 11 and a recording portion 12 formed of pits in the similar manner to that of the ROM portion 2. The header 11 is composed of four IDs 13-1, 13-2, 13-3, and 13-4. In each of ID1 to ID4, address information 14, an address mark (AM) 15 placed ahead of the address 14, for synchronization when demodulating the address information 14, a VFO area 16 for assisting an operation of a PLL circuit for reproducing the address mark (AM) 15 to generate a synchronizing reproduction clock, and the like are recorded. The recording portion 12 includes the VFO area 16, a recording data portion 18, and guard areas 17-1 and 17-2 for protecting the recording data portion 18 and the VFO area 16. The recording data portion 18 has the same format as that of the data portion 7 of the ROM portion, and includes a sector address 6 and a data portion 7.

As will be understood from this configuration, the RAM portion 3 is mostly occupied with portions other than the data portions 7 actually used as user data, and hence, has higher redundancy than the ROM portion 2. Therefore, even when the ROM portion 2 and the RAM portion 3 are recorded at substantially the same linear density, the number of the sectors per track becomes larger in the ROM portion 2 than in the RAM portion 3. Furthermore, since the ROM portion 2 is cut (pits are formed) by a cutting machine, considerably higher density recording is possible, compared with the linear density of the RAM portion 3. For the above-mentioned various reasons, as in the present embodiment, it is possible to configure the RAM portion 3 and the ROM portion 2 in such a manner that the number of sectors per track becomes larger in the ROM portion 2 than in the RAM portion 3. Thus, a higher density disk can be realized.

As described in the prior art, in a disk having a RAM portion and a ROM portion in which concave or convex pits are continuously recorded at a constant linear speed, a number of operations are required to be performed successively during boot-up of the disk before data is read. Thus, such a disk has a disadvantage of a long boot-up time.

In contrast, in the disk of the present embodiment, the leading edges of the sectors in the ROM portion 2 including control data are radially arranged. Therefore, in order to make a reproduction period of each sector of the ROM portion 2 constant, the disk of the present embodiment is required to be rotated at a constant angular velocity (CAV). The CAV control allows a disk to boot up in a shorter period of time and to be stabilized, compared with a motor control in which a linear speed becomes constant.

In the present embodiment, the case where the ROM portion 2 (including a lead-in) is placed inside of a disk has been described. However, the ROM portion 2 may be placed outside of the disk. Furthermore, a lead-in may be placed in the RAM portion.

As is understood from FIG. 1, the leading edge of the sector of the ROM portion 2 is aligned with the leading edge of the sector of the RAM portion 3 at one place per track.

Figure 3:
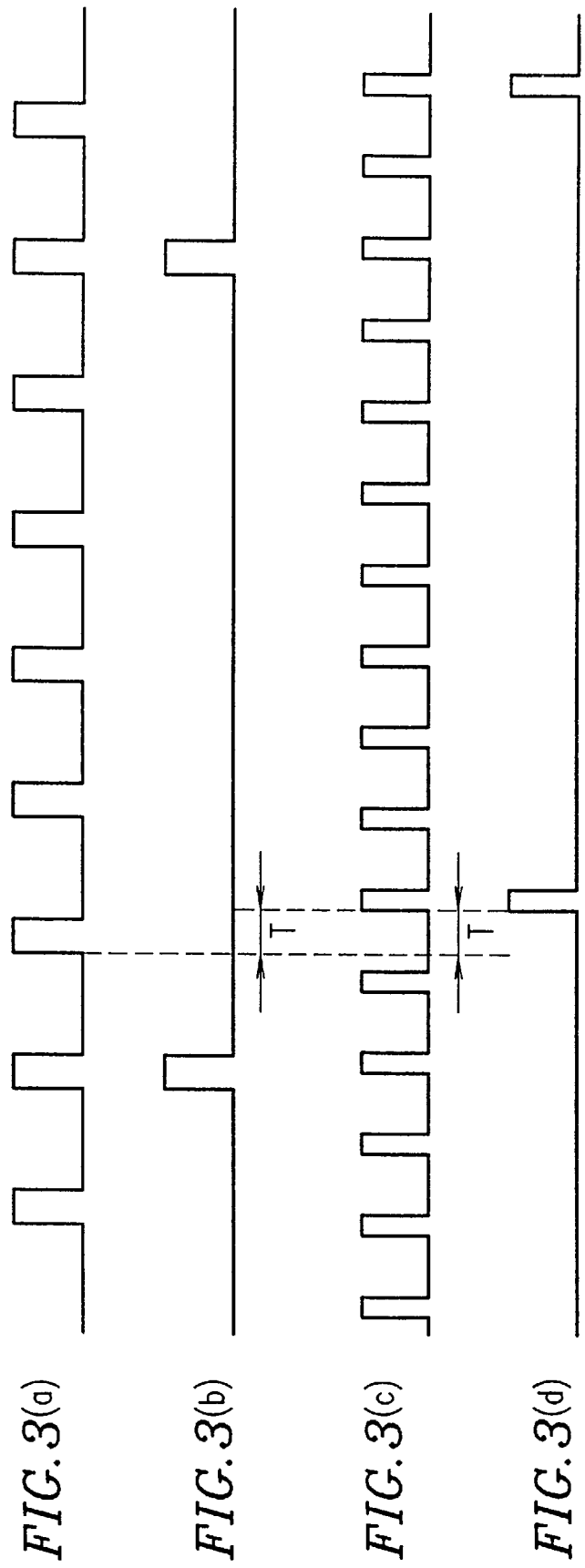
FIGS. 3(a) through 3(d) are timing diagrams illustrating a seek method at a time of reproducing the optical disk in the first embodiment of the present invention.

FIG. 3 is a timing diagram illustrating a seek method when the disk 1 is reproduced by a drive. In general, the rough adjustment of the control of motor rotation in the case of reproducing the disk by the drive is conducted by checking a period of an FG pulse generated by the motor. In FIG. 3, it is assumed that (a) represents an FG pulse from the motor, and (b) represents one track synchronization signal generated by dividing the FG pulse (a), where 6 FG pulses are generated per track. (c) represents a signal generated from a sync pattern showing a position of e sector address during reproduction of the ROM portion. As is understood from FIG. 1, there are 10 sector addresses per track.

First, control data which is a part of the ROM portion 2 is reproduced during boot-up of the disk 1. The sector address 6 in the control data portion at which the leading edges of the sectors 4 of the ROM portion 2 and the RAM portion 3 are aligned is determined when a master disk is cut. A time difference T between the signal generated from the sync pattern S 8 at a portion where the leading edges of the sectors 4 of the ROM portion 2 and the RAM portion 3 are aligned and an FG pulse immediately before the signal is measured and memorized.

While the address information 14 of the RAM portion 3 is being read, seeks are performed. However, sectors in which data is recorded and data is not recorded are present in the RAM portion 3. Therefore, in order to read the address information 14, a gate signal is required, which becomes "1" at a timing when the header 11 containing the address information 14 is read. In FIG. 3, (d) represents a gate signal for seeks which becomes "1" at the time when the header 11 is read after a previously memorized predetermined period of time T from a predetermined FG pulse. In response to this gate signal, the PLL circuit starts its operation. The PLL circuit uses the VFO area 16 to synchronize a synchronization reproduction clock with the clock signal of the apparatus, whereby the address information 14 is read. For example, in the case where a gate signal is generated by an envelope or the like of a reproduction signal, the quality of the gate signal may become very bad depending upon the signal. However, when a gate signal is generated by the above-mentioned method, it is assured that the address information 14 can be read once per track.

Embodiment 2

Figure 4:
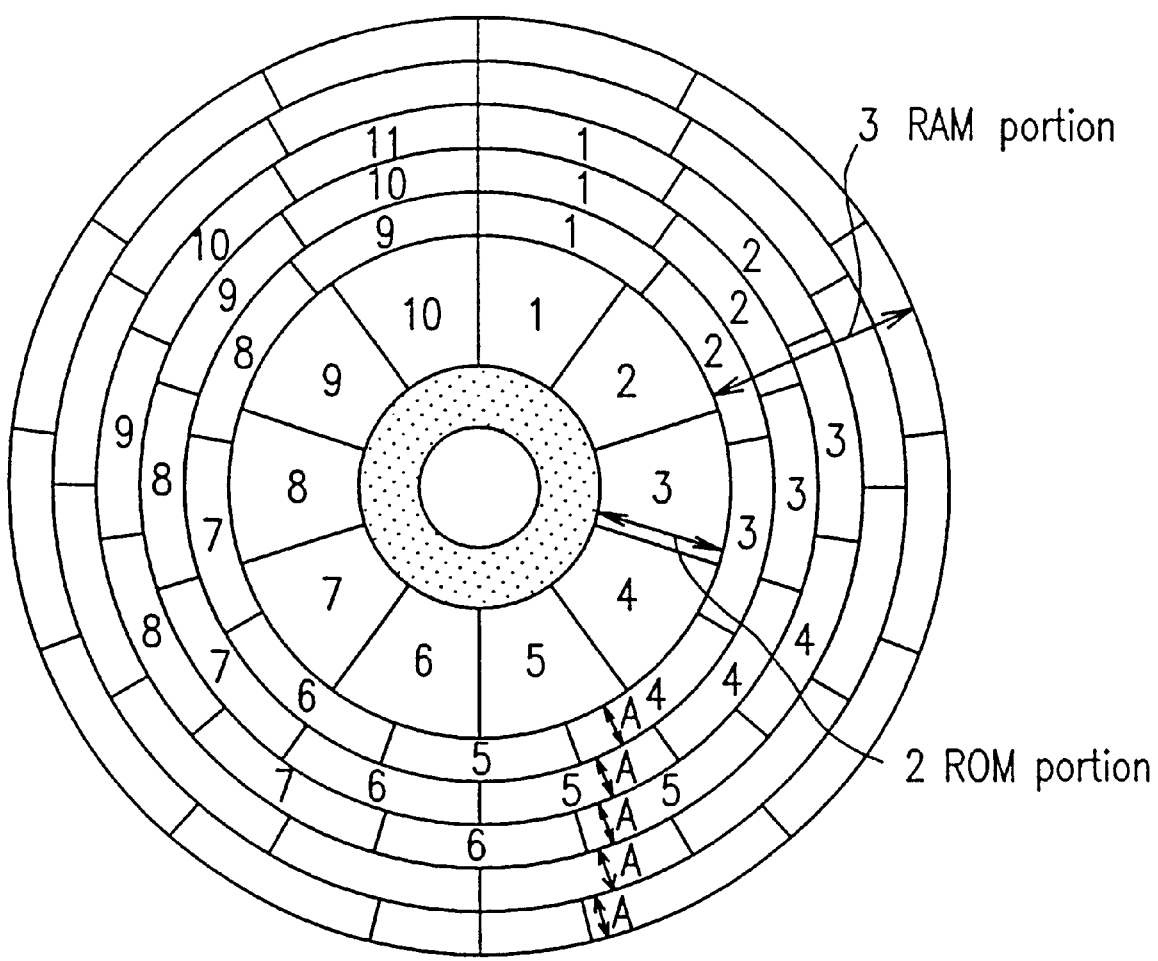
FIG. 4 is a schematic diagram of an optical disk in the second embodiment of the present invention.

FIG. 4 is a schematic diagram of an optical disk having a ROM portion and a RAM portion in the second embodiment of the present invention.

The second embodiment is different from the first embodiment in that the RAM portion 3 is divided into zones. In the ROM portion 2, the leading edges of sectors 4 are radially arranged in the same manner as the first embodiment. The leading edges of sectors 4 in the RAM portion 3 are aligned with the leading edges of the sectors 4 in the ROM portion 2 once per track. Furthermore, in the data area of the RAM portion 3, the number of tracks contained in each zone is equal to each other. This is not applicable to an area (e.g., a lead-out area) other than the data area.

Figure 5:
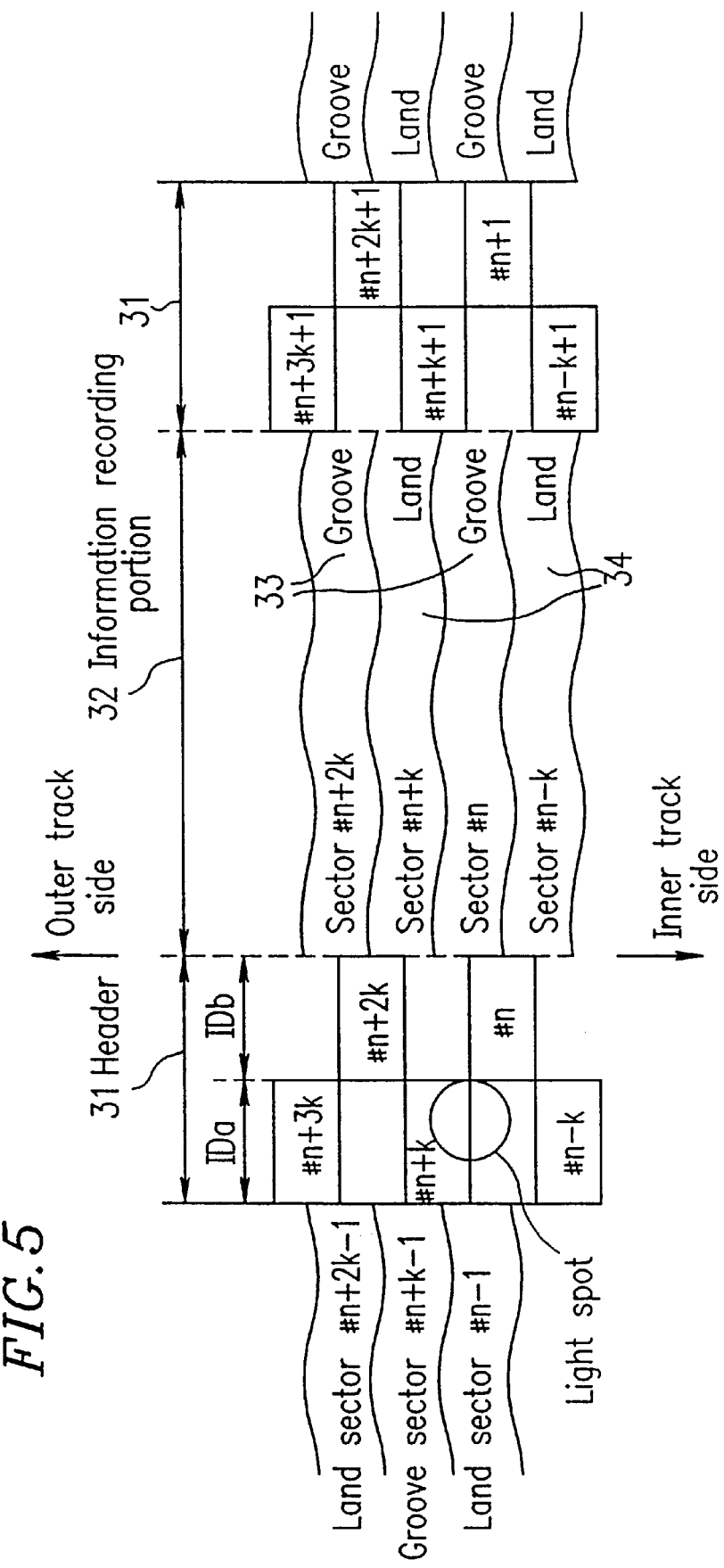
FIG. 5 is a diagram showing a configuration of a RAM portion of the optical disk in the second embodiment of the present invention.
Figure 6:
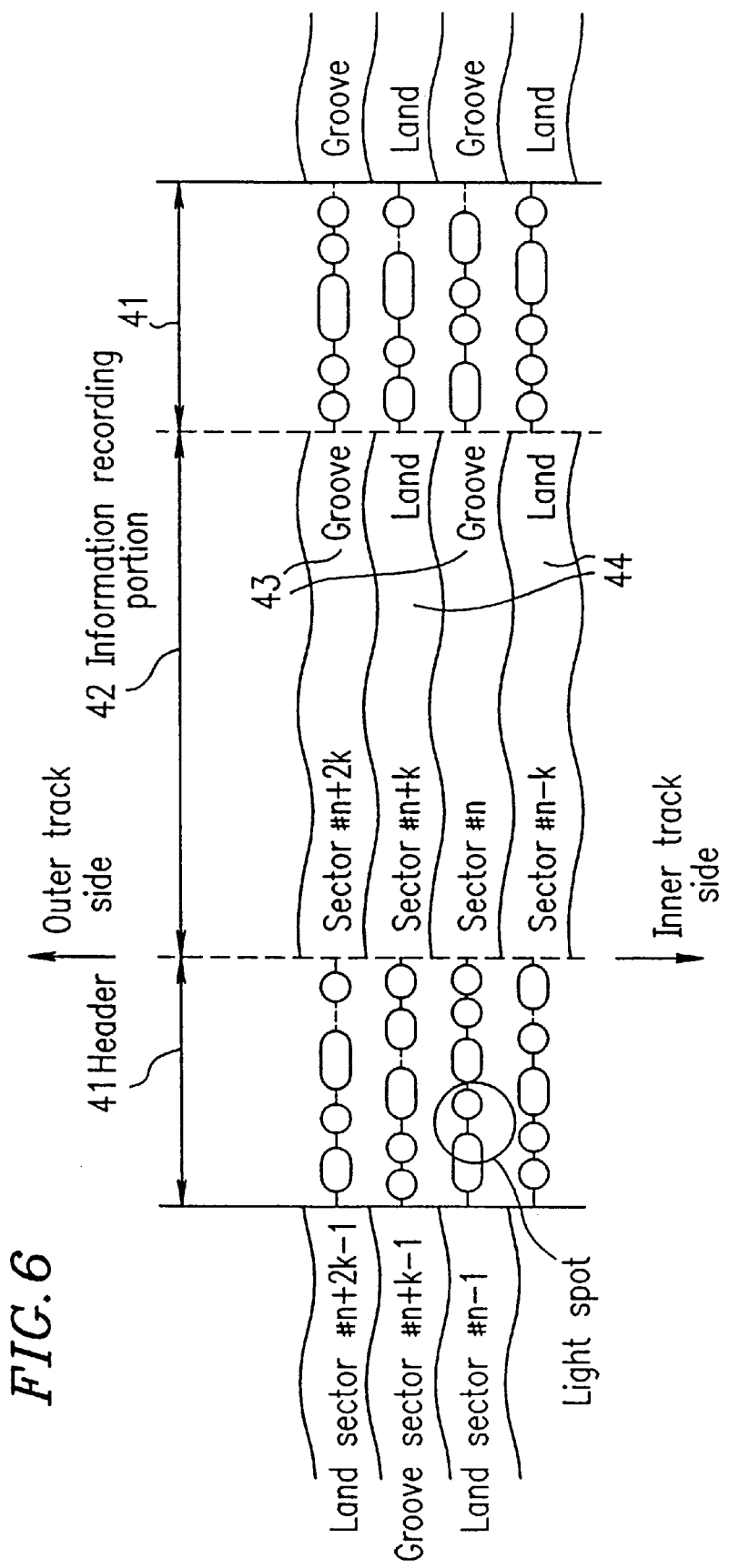
FIG. 6 is a diagram showing a configuration of the RAM portion of the optical disk in the second embodiment of the present invention.

FIGS. 5 and 6 are diagrams showing configurations of the RAM portion 3 shown in FIG. 4.

FIG. 5 shows two pieces of address information of a header 31, which are shifted to an inner track side or an outer track side by a ½ track pitch. Furthermore, the width of a pit signal of the header 31 is designed so as to be substantially equal to the width of a groove portion 33 and a land portion 34 in an information recording portion 32.

The address information of a header 41 in FIG. 6 is designed so as to be included in a groove portion 43 and a land portion 44, respectively, and the address information is positioned almost at the center of each of the groove portion 43 and the land portion 44. Furthermore, the width of a pit signal of the header 41 is designed so as to be narrower than that of the groove portion 43 and the land portion 44 in an information recording portion 42.

In both the cases shown in FIGS. 5 and 6, the groove portions 33 and 43 and the land portions 34 and 44 sinusoidally wobble in the vertical direction to a trace direction of tracks. In the case where the drive records data onto the information recording portion 32 or 42 of the RAM portion 3, it detects the period of the wobble to generate a clock signal synchronized with the detected signal, and writes data in synchronization with the clock. The wobble almost continuously appears along one track with respect to the groove portions 33 and 43 and the land portions 34 and 44. Therefore, the PLL circuit rapidly synchronizes a synchronization reproduction clock with the clock signal of the apparatus, resulting in a reduction of a recording time.

Figure 7:
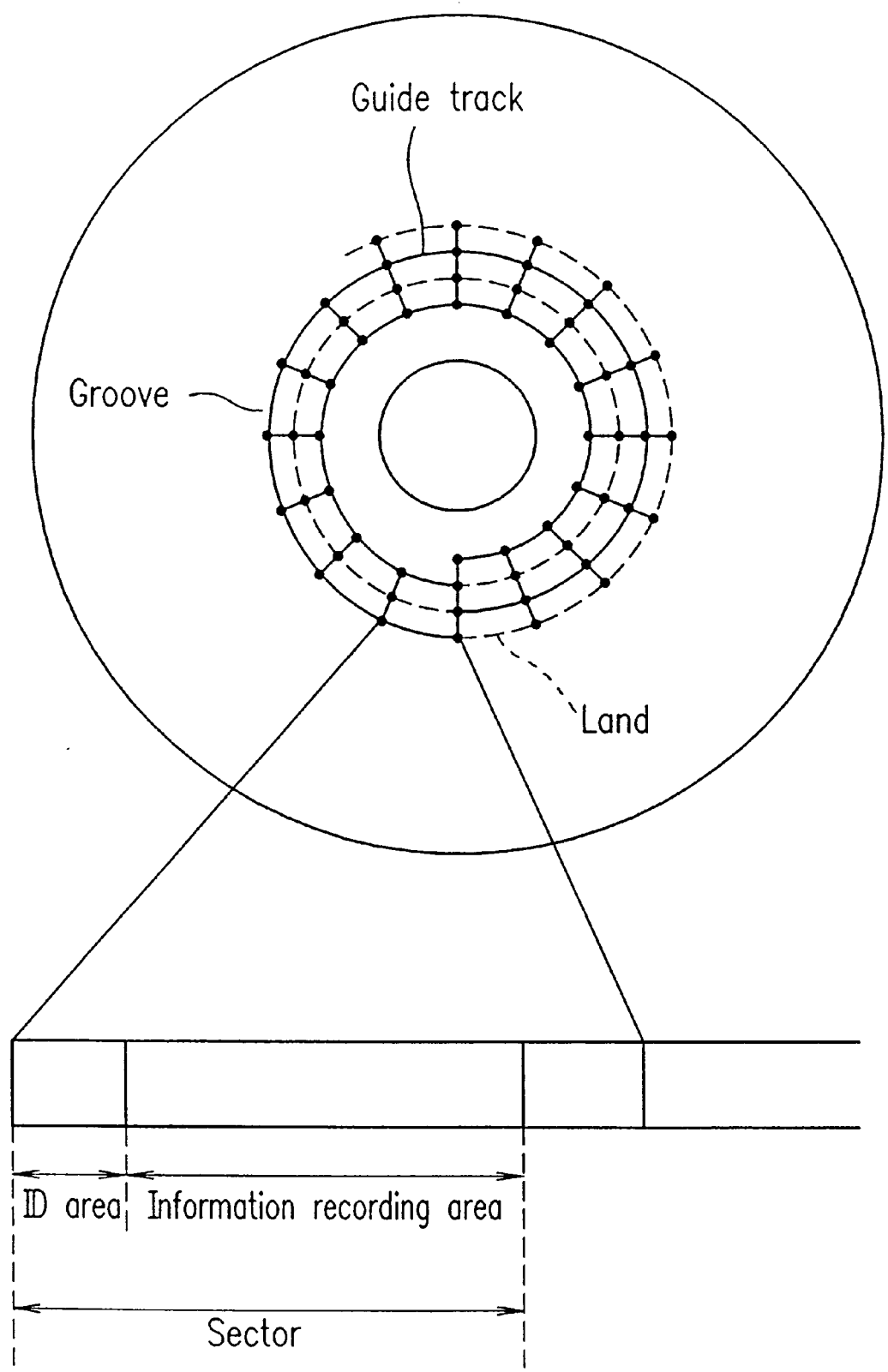
FIG. 7 is a diagram showing a configuration of a track in the RAM portion of the optical disk in the second embodiment of the present invention.

FIG. 7 is a schematic diagram of a disk illustrating a configuration of guide tracks (groove portions and land portions) of the RAM portion 3 shown in FIG. 4.

The guide tracks are provided so that when information is recorded/reproduced by a drive, the spot of a light beam emitted by an optical head can trace a particular path. The groove portions (represented by a solid line) and the land portion (represented by a broken line) are switched at each rotation. Furthermore, information can be recorded on both the groove portions and the land portions. The guide tracks shown in FIG. 7 have a spiral shape. However, they may be concentrically arranged, or the spiral direction may reverse.

Figure 8:
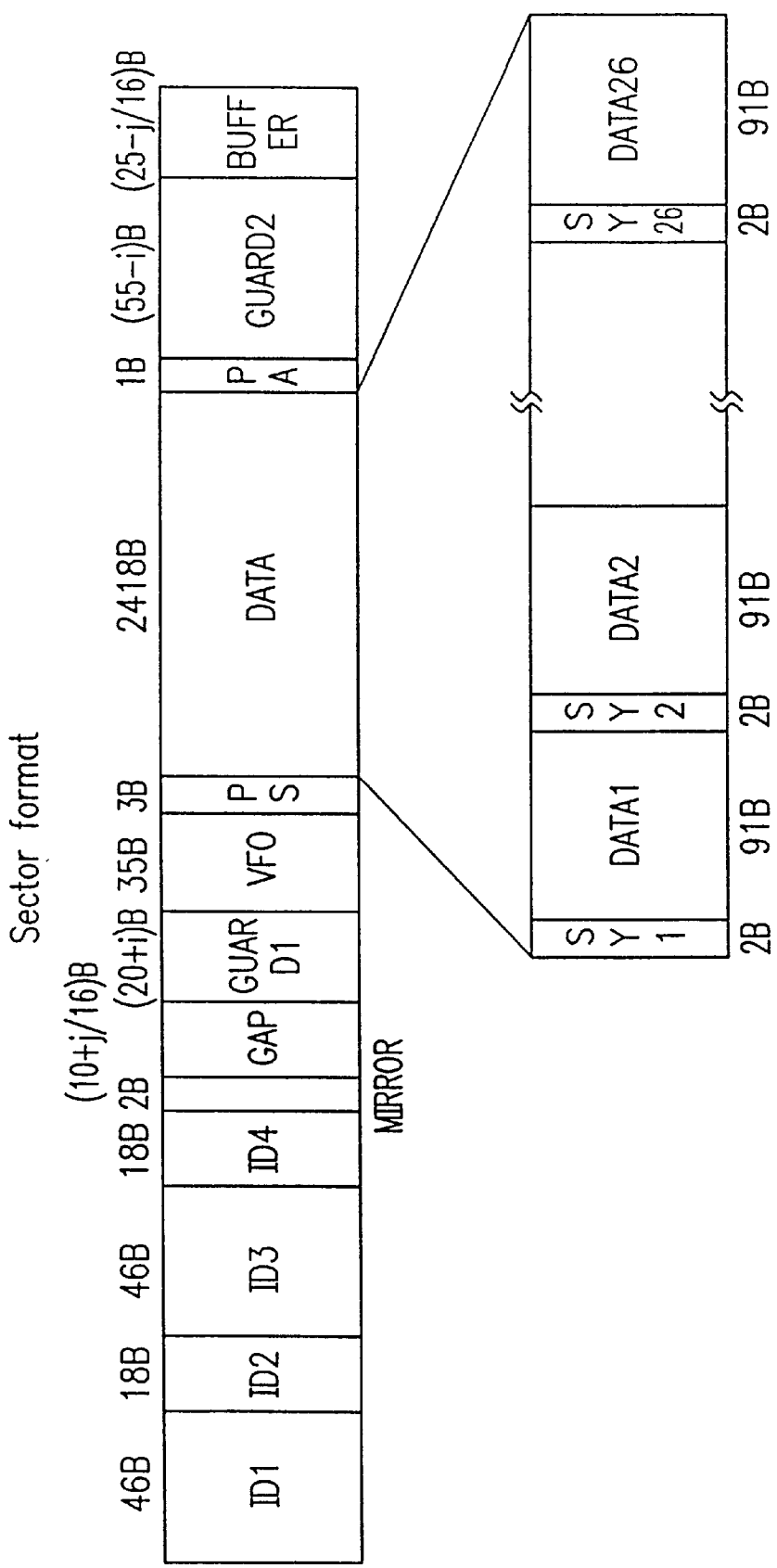
FIG. 8 is a diagram showing a configuration of a sector format in the RAM portion of the optical disk in the second embodiment of the present invention.

FIG. 8 is a diagram showing a configuration of a sector format of the header 31 and the information recording portion 32 in FIG. 5 in detail.

One sector contains 2697 Bytes (hereinafter, abbreviated as "B") in total of the header 31 (XDa, IDb) and the information recording portion 32. The information recording portion 32 in which information is actually recorded includes a GUARD1 portion ((20+i) B), a VFO portion (35 B), a PS portion (3 B), a DATA portion (2418 B), a PA portion (1 B), and a GUARD2 portion ((55−i) B). Among them, the DATA portion (2418 B) has the same format as that of the data area 5 in the ROM portion in FIG. 1, and is composed of the combinations of an SY1 portion (2 B) and a DATA1 (91 B), an SY2 portion (2 B), and a DATA2 portion (91 B), . . . , and an SY26 portion (2 B) and a DATA26 (91 B) portion. In the header 31, IDa is composed of ID1 (46 B) and ID2 (18 B), and IDb is composed of ID3 (46 B) and ID4 (18 B). In a MIRROR portion (2 B), a GAP portion ((10+j/16) B), and a BUFFER portion ((25−j/16) B), significant information is not recorded. Here, i denotes an integer of 0 to 7, and j denotes an integer of 0 to 16.

ID1 to ID4 are used for identifying addresses of sectors, as well as for identifying whether a subsequent guide track is a groove or a land. The MIRROR portion and the GAP portion are used for adjusting the laser power at the time of recording. Furthermore, the BUFFER portion is used for adjusting a shift in a time axis direction of data to be recorded based on the rotation variation of an optical disk and the eccentricity of the optical disk. The GUARD1 portion and the GUARD2 portion are used for protecting the leading edge and the trailing edge of data from being degraded due to repeated recording. The VFO portion helps the operation of the PLL circuit for generating a reproduction clock at a time of reproduction. The PS portion is used for indicating the beginning of data, and the PA portion is used for recording data required for completing the last data in each sector in data modulation performed at a time of recording.

Figure 9:
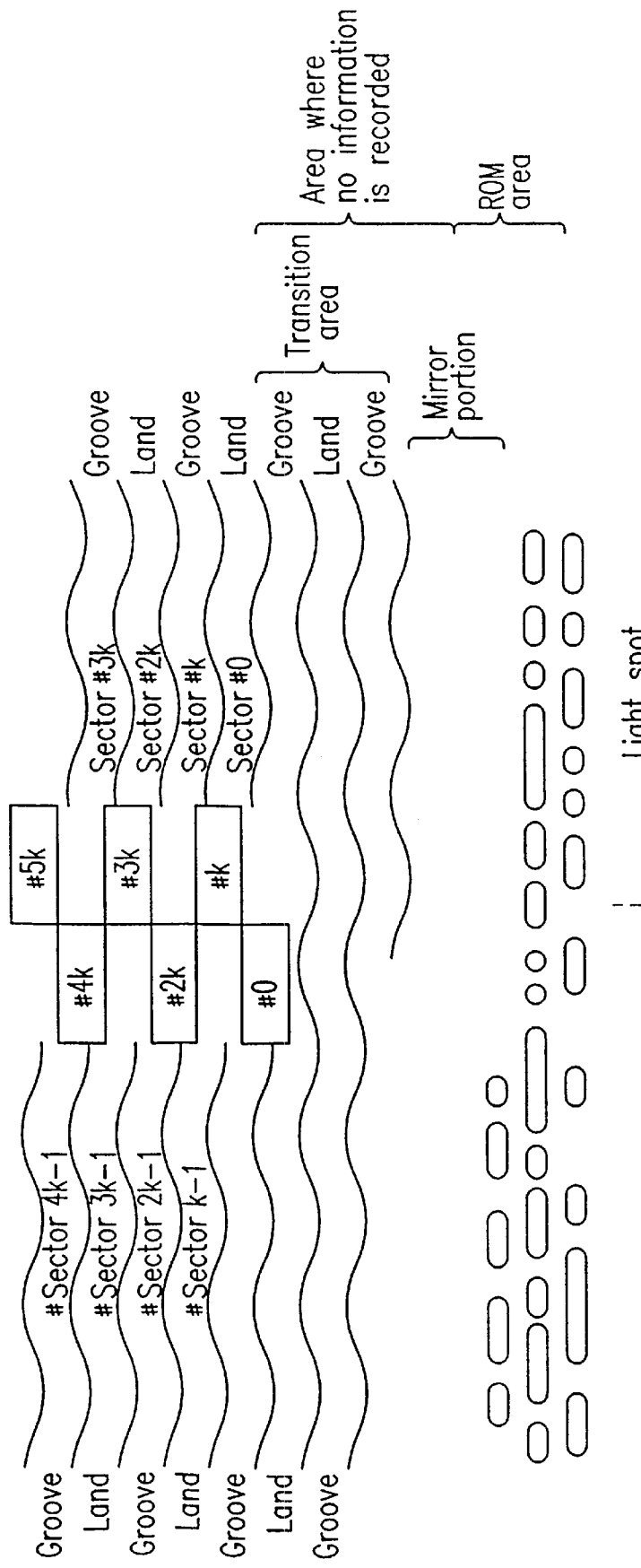
FIG. 9 is a diagram showing a configuration of a boundary area between the ROM portion and the RAM portion of the optical disk in the second embodiment of the present invention.

FIG. 9 is an enlarged diagram of a boundary area between the ROM portion 2 and the RAM portion 3.

As shown in FIG. 9, it is considered that a transition area is composed of continuous tracks (tracks without any header) containing a wobble signal or is constructed so as to contain a header in the same way as in the RAM portion 3 described above. In either case, a processing clock for performing recording can be generated.

In the RAM portion 3 thus constructed, the number of sectors in each zone increases by one sector from an inner track to an outer track. The purpose of such a zone format is to increase a recording capacity, with a recording/ reproduction length (hereinafter, referred to as a "bit length") on a disk required for one bit of user data being almost the same in each zone having different track lengths. In accordance with this, the number of rotations of the disk is changed, i.e., the number of rotations of the disk is prescribed to be larger on an outer zone, and a CAV constant is performed in each zone, whereby the bit length recorded and reproduced is made substantially constant. Since a track length on the innermost side and that on the outermost side are different in one zone, the bit length actually changes slightly. However, the change amount falls within an allowable error range of the bit length involved in recording and reproduction of the bit length.

The above-mentioned configuration has an advantage in that if it is previously known which zone is sought, the rotation speed of a disk can be immediately accelerated to the rotation speed corresponding to the seek zone. Furthermore, in the disk of the present embodiment, the number of tracks in each zone is equal to each other. Therefore, it is readily known how many tracks should be jumped from the current sector address to a seek sector address, or a seek zone is easily known based on the number of tracks to be jumped.

In the case where a master disk of the present embodiment is cut, a motor is generally driven by a CAV control, and the bit rate of a signal to be recorded is controlled in each zone, whereby the bit length is kept almost constant. Thus, the bit rate is required to be switched at a transition point between zones. Therefore, the number of tracks is counted, and a bit rate is switched with a count-up signal. When the number of tracks in each zone is equal to each other, this control can be easily performed, and a circuit can be easily configured.

Embodiment 3

Figure 10:
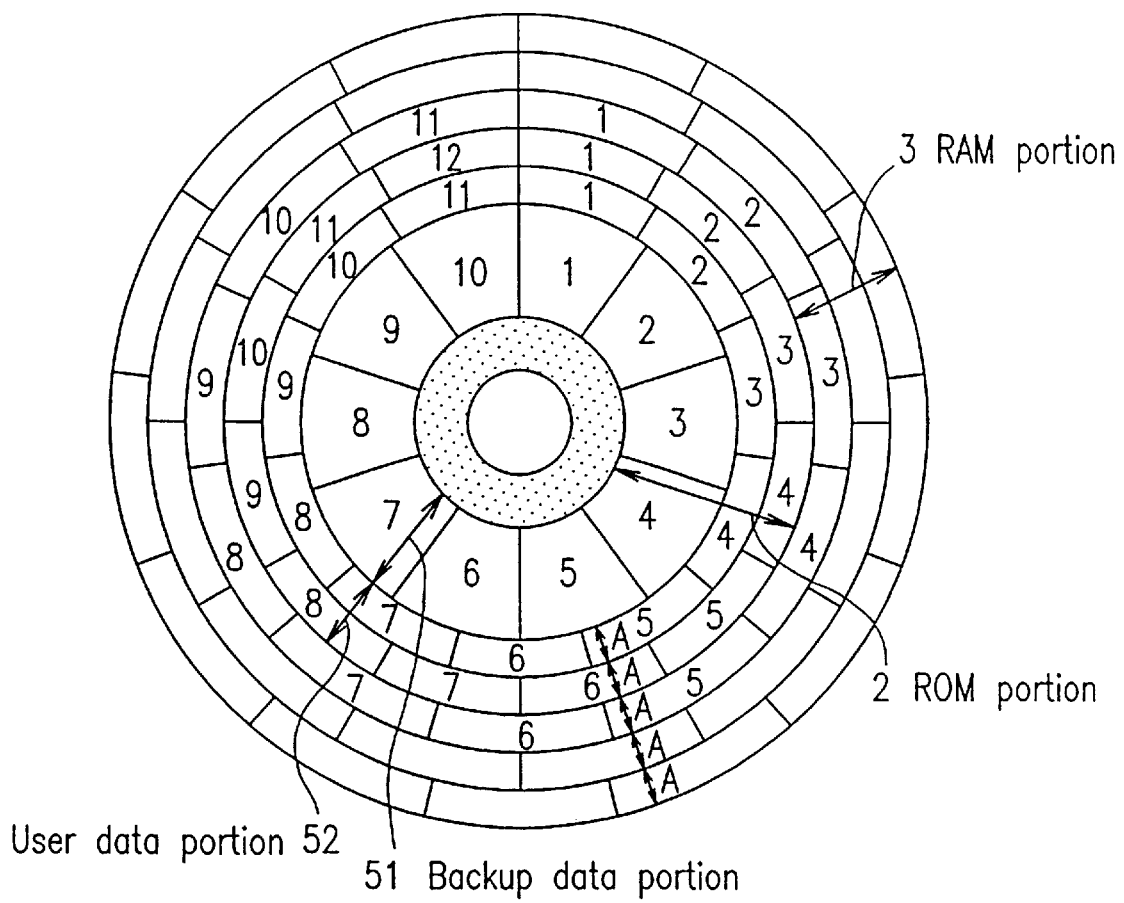
FIG. 10 is a schematic diagram of an optical disk in the third embodiment of the present invention.

FIG. 10 is a schematic diagram of an optical disk having a ROM portion and a RAM portion in the third embodiment of the present invention. The third embodiment is different from the second embodiment in that a ROM portion 2 is composed of a backup data portion 51 and a user data portion 52. All the leading edges of the sectors in the backup data portion 51 are radially arranged. The user data portion 52 is divided into zones, and all the leading edges of the sectors are radially arranged. Furthermore, as described in the first embodiment, a sector address 6 is contained in the leading edge of each sector 4 of the ROM portion 2, so that each sector in the user data portion 52 does not necessarily require a header as in each sector in the RAM portion 3. One zone of the user data portion 52 of the ROM portion 2 is compared with one zone of the RAM portion 3 of the first embodiment. If both the zones are placed at the same position in a radius direction, the number of sectors having no header in the former zone becomes larger than the number of sectors having headers in the latter zone.

The purpose of the disk is that the user data portion 52 of the ROM portion 2 is cut so as to have some contents, and the ROM portion 2 containing the contents and the rewritable RAM portion 3 are provided. Such a disk is capable of easily having a user data area (RAM 3) required for a game, for example, with respect to the contents thereof, and taking in a user desirable image into the RAM portion 3 to synthesize the contents into characters or the like. Furthermore, even a disk having the same contents can be provided with added values in the form desired by a dealer or the like. Irrespective of the ROM portion 2 and the RAM portion 3, the number of tracks in each zone is equal to each other, so that the same effects as those in the second embodiment can be obtained with respect to cutting and seeks.

Embodiment 4

Figure 11:
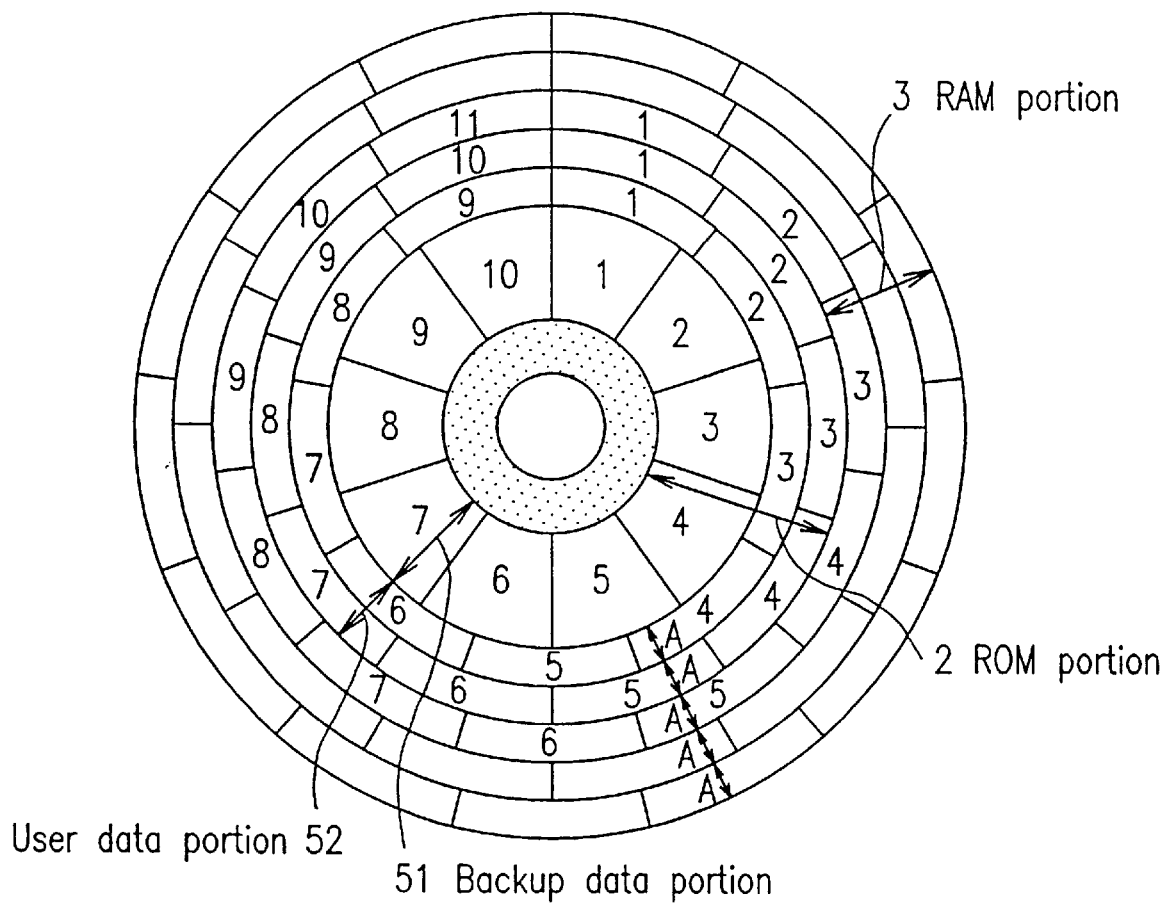
FIG. 11 is a schematic diagram of an optical disk in the fourth embodiment of the present invention.

FIG. 11 is a schematic diagram of an optical disk having a ROM portion and a RAM portion in the fourth embodiment of the present invention. The fourth embodiment is different from the third embodiment in that a user data portion 52 of the ROM portion 2 also has the same sector format (FIG. 8) as that of the RAM portion 3 in FIG. 4.

In the present embodiment, since the user data portion 52 of the ROM portion 2 has the same sector format as that of the RAM portion 3 as described above, a sector address in any position can be made completely the same as that of the disk in the second embodiment. In this case, there is an advantage in that a disk having a ROM portion containing contents of game program, etc. and a RAM portion can be reproduced by a drive in almost the same way as in the second embodiment.

Figure 12:
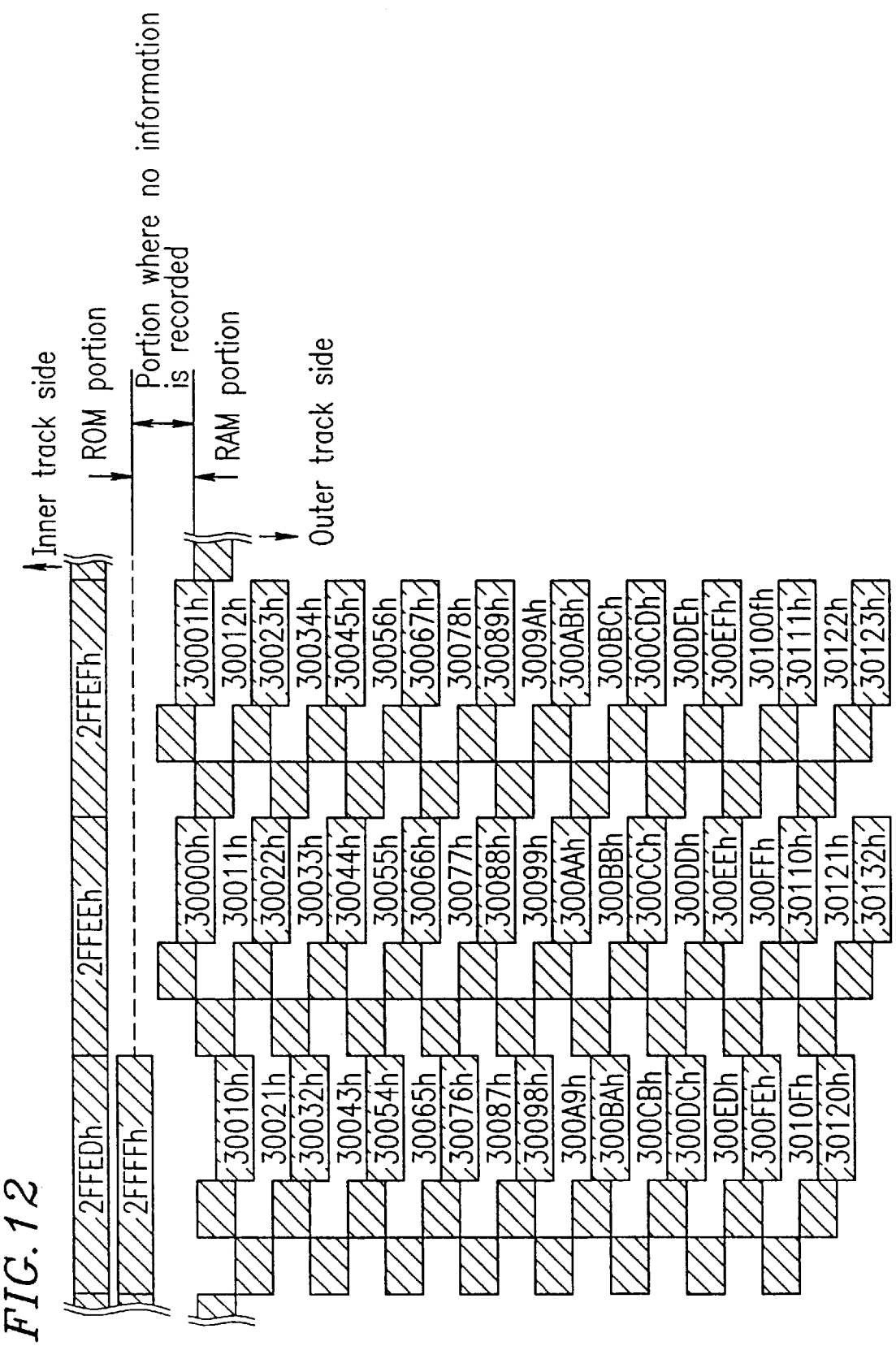
FIG. 12 is a diagram showing a configuration of addresses in the boundary area between the ROM portion and the RAM portion.

FIG. 12 is a diagram illustrating connections of sector addresses at switching points between the RAM portion 2 and the ROM portion 3.

Furthermore, in the present embodiment, or even in the first to third embodiments, when the sector addresses of the ROM portion 2 and the RAM portion 3 are continuous, data can be very easily managed, and no problem occurs during seeks. If the sector addresses are overlapped with each other or skipped between the ROM portion 2 and the RAM portion 3, when a user specifies the overlapped or skipped address, a problem occurs.

Furthermore, when data for identifying the boundary area between the ROM portion and the RAM portion is recorded in the backup data portion, tracking and switching of a gain or the like of a recording and a reproduction signal can be smoothly performed. In a disk having a high density ROM portion and a RAM portion, tracking is performed by a phase difference method or a 3-beam method in the ROM portion due to the presence of pits therein, and tracking is performed by a push-pull method in the RAM portion, since the RAM portion includes an area where data is not recorded. Thus, if data identifying the boundary area is recorded in a control portion of a lead-in, switching of tracking methods is smoothly performed.

For simplicity, the present invention has been described exemplifying the case where the number of sectors in one track of the ROM portion is 10, and the number of sectors in one track of the entire RAM portion or the first zone of the RAM portion is 9. However, any number of sectors may used as long as the number of sectors in the ROM portion is larger than that of the RAM portion in the first embodiment, and as long as the number of sectors is an integer in the second embodiment Furthermore, in the third embodiment, the number of sectors in the lead-in portion in one track of the ROM portion is set to be 10, those in the first zone and the second zone are set to be 11 and 12, and the number of sectors in one track in the first zone of the RAM portion is set to be 11. However, any number of sectors may be used as long as it is an integer.

In the fourth embodiment, the number of sectors in the lead-in portion in one track of the ROM portion is set to be 10, those in the first zone and the second zone are set to be 9 and 10, and the number of sectors in one track in the first zone of the RAM portion is set to be 11. However, any number of sectors may be used as long as it is an integer. The numbers of zones in the ROM portion and the RAM portion should be integers.

The following table shows an example of a disk having a ROM portion and a RAM portion according to the present invention. The disk in this example basically has the same configuration as that of the disk in the second embodiment.

In the following table, part of a ROM portion, a non-recording portion, and a RAM portion forms a lead-in area. The other part of the RAM portion forms a data area and a lead-out area. Part of the RAM portion included in the lead-in area and Zone 0 form substantially one zone, which has 1888 tracks each having 17 sectors. Zone 1 has 1888 tracks each having 18 sectors. Each of the other outer Zones 2 to 23 has the same number of tracks; however, the number of sectors increases by one in each zone outward. A lead-out area is provided on the outermost side.

Backup data is previously recorded in the ROM portion. The non-recording portion is an area of the mirror where data is not recorded. Backup data such as defect administering information is recorded in part of the RAM portion included in the lead-in area during recording/reproducing a disk, if required. In the lead-out area, backup data is previously recorded.

TABLE

| Zone | | Number of sectors per track | Number of tracks |
|---|---|---|---|
| Lead-in area | ROM portion | Backup data portion | 18 | 1896 |
| | Non-recording portion | | | |
| | RAM portion | Backup data portion | 17 | 1888 |
| Data area | 0 | 17 | |
| | 1 | 18 | 1888 |
| | 2 | 19 | 1888 |
| | 3 | 20 | 1888 |
| | 4 | 21 | 1888 |
| | 5 | 22 | 1888 |
| | 6 | 23 | 1888 |
| | 7 | 24 | 1888 |
| | 8 | 25 | 1888 |
| | 9 | 26 | 1888 |
| | 10 | 27 | 1888 |
| | 11 | 28 | 1888 |
| | 12 | 29 | 1888 |
| | 13 | 30 | 1888 |
| | 14 | 31 | 1888 |
| | 15 | 32 | 1888 |
| | 16 | 33 | 1888 |
| | 17 | 34 | 1888 |
| | 18 | 35 | 1888 |
| | 19 | 36 | 1888 |
| | 20 | 37 | 1888 |
| | 21 | 38 | 1888 |
| | 22 | 39 | 1888 |
| | 23 | 40 | 1888 |
| Lead-out area | Backup data portion | 40 | 1446 |

Embodiment 5

Figure 13:
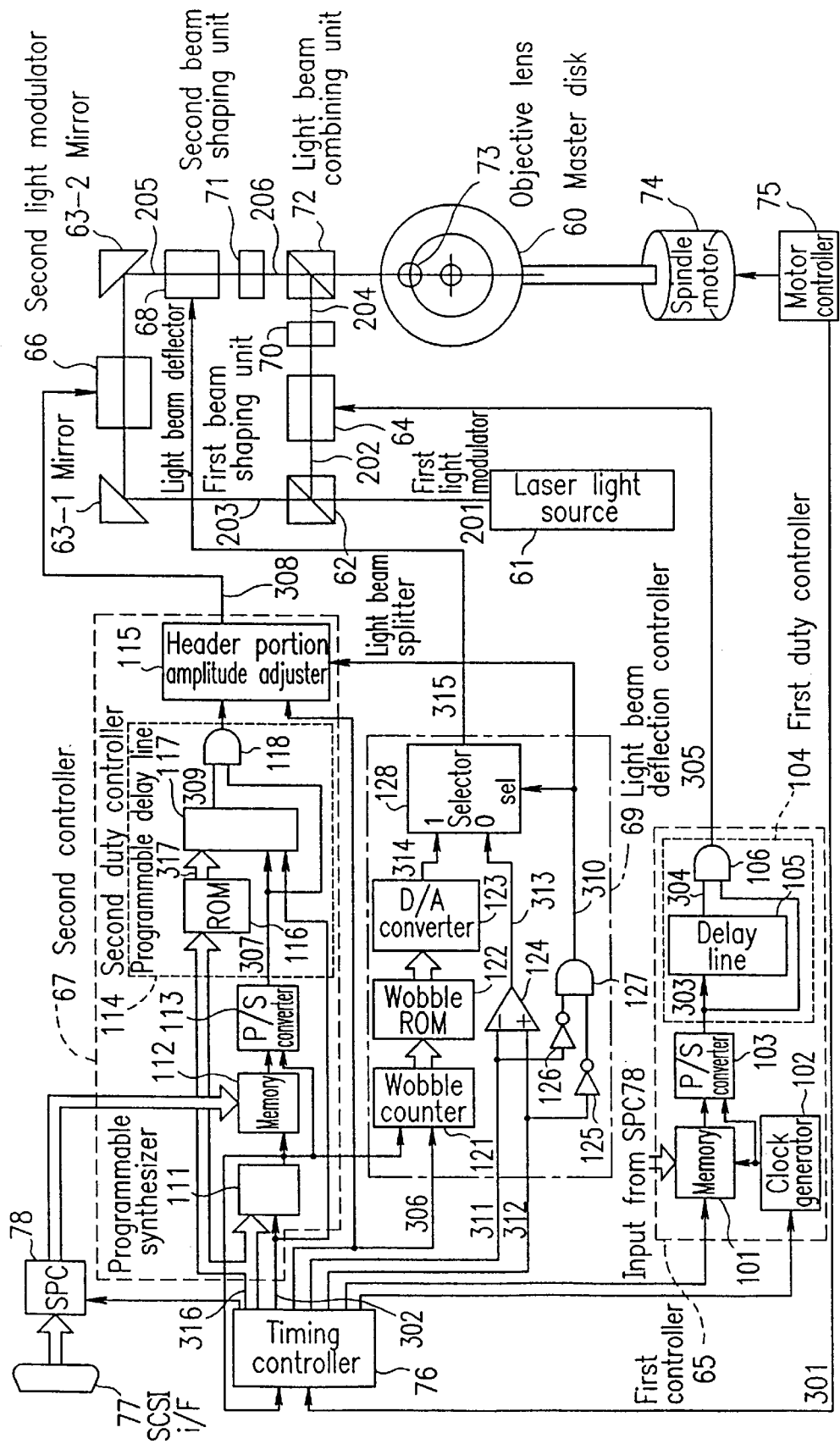
FIG. 13 is a block diagram showing a disk recording apparatus in the fifth embodiment of the present invention.

FIG. 13 is a block diagram showing a disk recording apparatus in the fifth embodiment of the present invention. The disk recording apparatus records data onto a master disk of the optical disk illustrated in the second embodiment.

In FIG. 13, reference numeral 60 denotes a master disk, 61 denotes a laser light source irradiating the master disk 60, 62 denotes a light beam splitter for splitting a light beam from the laser light source 61 into a light beam forming pits in a ROM portion and a light beam for forming grooves and headers in a RAM portion, 63-1 and 63-2 denote mirrors, 64 denotes a first light modulator for modulating the light beam forming pits in the ROM portion, 65 denotes a first controller for controlling the first light modulator 64 based on recording data to be input, 66 denotes a second light modulator for modulating the light beam forming grooves and headers in the RAM portion, 67 denotes a second controller for controlling the second light modulator 66 based on recording data to be input, 68 denotes a light beam deflector for deflecting the light beam output from the second light modulator 66 in a direction orthogonal to a track direction, 69 denotes a light beam deflection controller for controlling the light beam defector 68, 70 denotes a first beam shaping unit for shaping a light beam from the first light modulator 64, 71 denotes a second beam shaping unit for shaping a light beam from the light beam deflector 68, 72 denotes a light beam combining unit for matching a light beam from the first beam shaping unit 70 with a light beam from the second beam shaping unit 71 and allowing the combined light to be incident upon an objective lens, 73 denotes an objective lens for condensing a light beam from the light beam combining unit 72, 74 denotes a spindle motor for rotating the master disk 60, 75 denotes a motor controller for controlling the spindle motor 74, and 76 denotes a timing controller for controlling a timing of the first and second controllers 65 and 67 and the light beam deflection controller 69 based on one rotation synchronization signal from the motor controller 75. Reference numeral 77 denotes an SCSI interface with an external hard disk (not shown), and 78 denotes an SPC (SCSI protocol controller) for inputting recording data into memories of the first and second controllers 65 and 67 from the external hard disk (not shown).

The first controller 65 includes a memory 101 for once accumulating data from the SPC 78, a clock generator 102 for generating a clock (hereinafter, referred to as a "channel clock in the ROM portion") with a period of one bit of recording data when the ROM portion is cut, a P/S convertor 103 for parallel/serial converting byte data from the memory 101 with a clock generated by the clock generator 102, and a first duty controller 104 for performing a duty control of a laser ON/OFF signal of the ROM portion which becomes serial by the P/S converter 103 between "1" and "0". Furthermore, the first duty controller 104 is composed of a delay line 105 and an AND circuit 106.

The second controller 67 includes a programmable synthesizer 111 for successively generating a clock (hereinafter, referred to as a "channel clock of the RAM portion") with a period of one bit of recording data when the RAM portion is cut in accordance with each zone of the RAM portion, a memory 112 for once accumulating data from the SPC 78, a P/S converter 113 for parallel/serial converting byte data from the memory 112 with a clock generated by the programmable synthesizer 111, and a second duty controller 114 for performing a duty control of a laser ON/OFF signal of the header portion of the RAM portion which becomes serial by the P/S converter 113 between "1" and "0", and a header portion amplitude adjuster 115 for adjusting an amplitude of a laser ON/OFF signal of the header portion of the RAM portion from the second duty controller 114. Furthermore, the second duty controller 114 is composed of a ROM 116 for outputting a delay amount corresponding to each zone of the RAM portion by the control of the timing controller 76, a programmable delay line 117 for delaying a laser ON/OFF signal from the P/S converter 113 based on the delay amount from the ROM 116, and an AND circuit 118.

The light beam deflection controller 69 includes a wobble ROM 122, a wobble counter 121 for periodically giving an address of the wobble ROM 122 in which data is recorded for generating a wobble signal with a channel clock of the RAM portion from the programmable synthesizer 111 and a reset signal from the timing controller 76, a D/A converter 123 for digital/analog converting data from the wobble ROM 122 to generate a sinusoidal wobble signal, a differential amplifier 124 for generating a timing signal for shifting a signal of the header portion of the RAM portion by a ½ track pitch in the vertical, direction to the tracks, NOT circuits 125, 126 and an AND circuit 127 for forming a signal for switching an output signal of the differential amplifier 124 with the wobble signal from the D/A converter 123, and a selector 128 for actually performing the switching.

Figure 14:
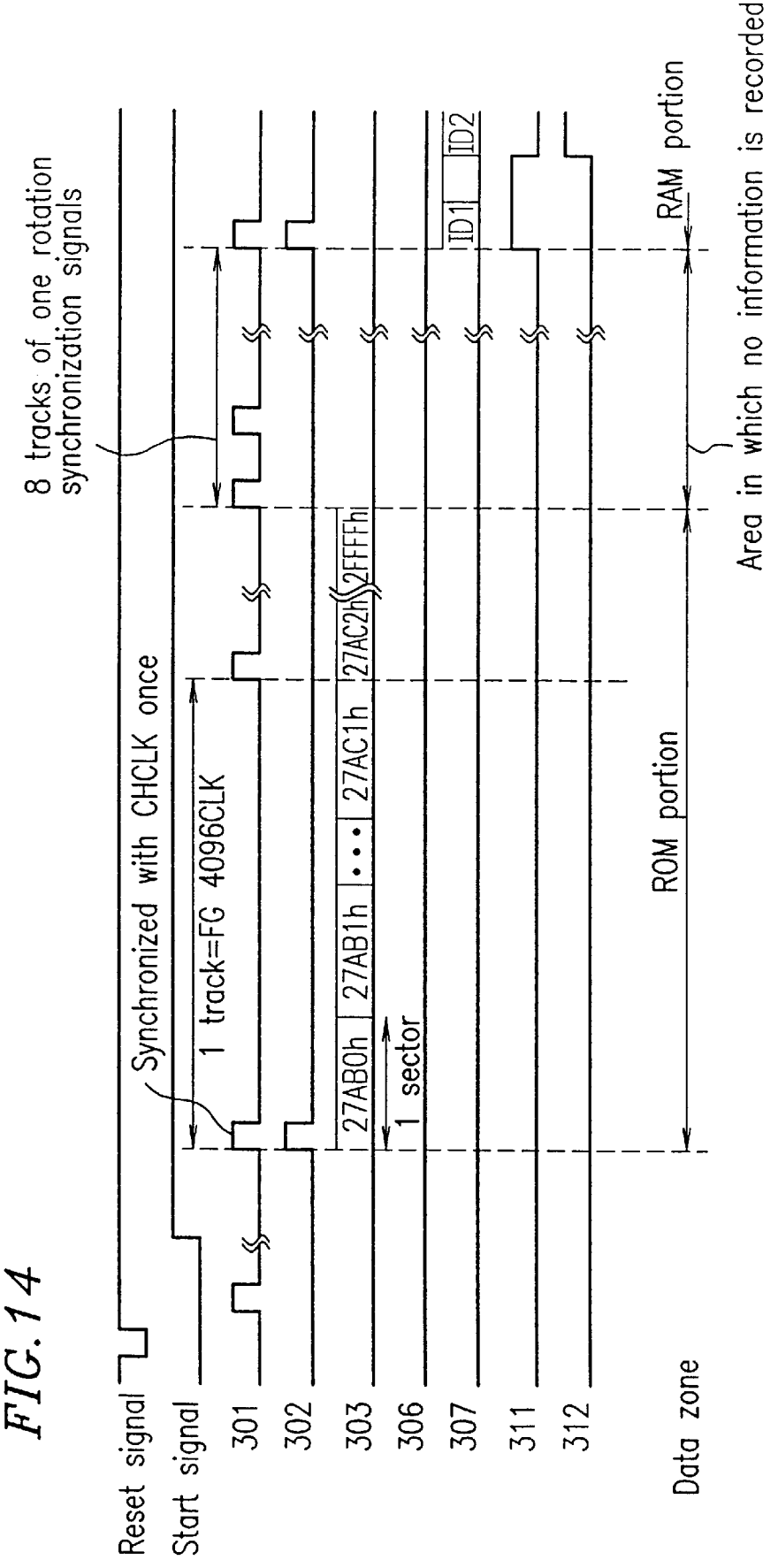
FIG. 14 is a timing diagram illustrating a cutting operation of the ROM portion of the disk recording apparatus in the fifth embodiment of the present invention.
Figure 15:
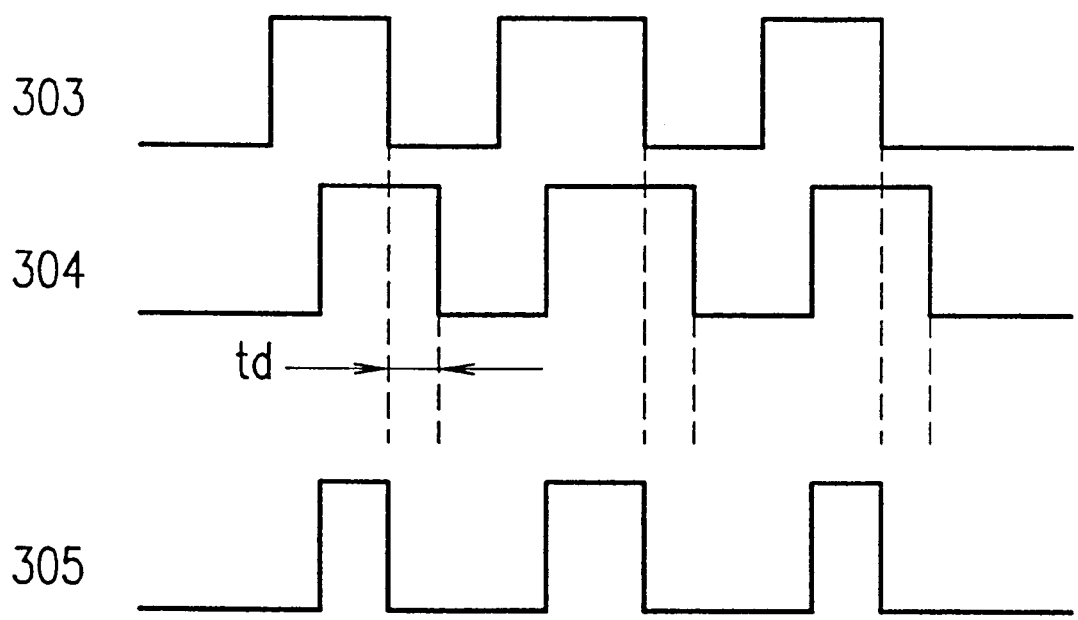
FIG. 15 is a timing diagram illustrating an, operation of a duty controller of the disk recording apparatus in the fifth embodiment of the present invention.
Figure 16:
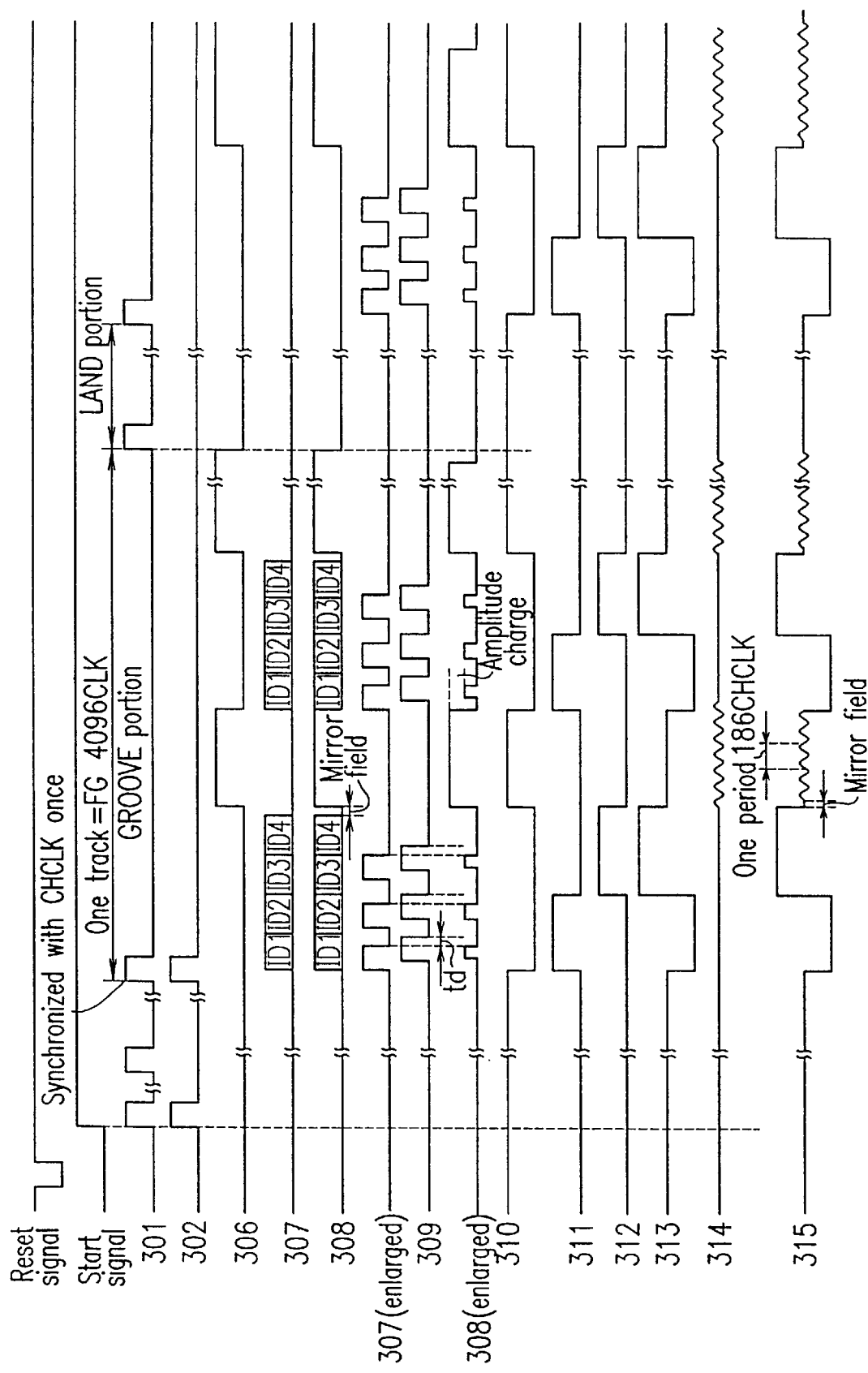
FIG. 16 is a timing diagram illustrating an cutting operation of the RAM portion of the disk recording apparatus in the fifth embodiment of the present invention.
Figure 17:
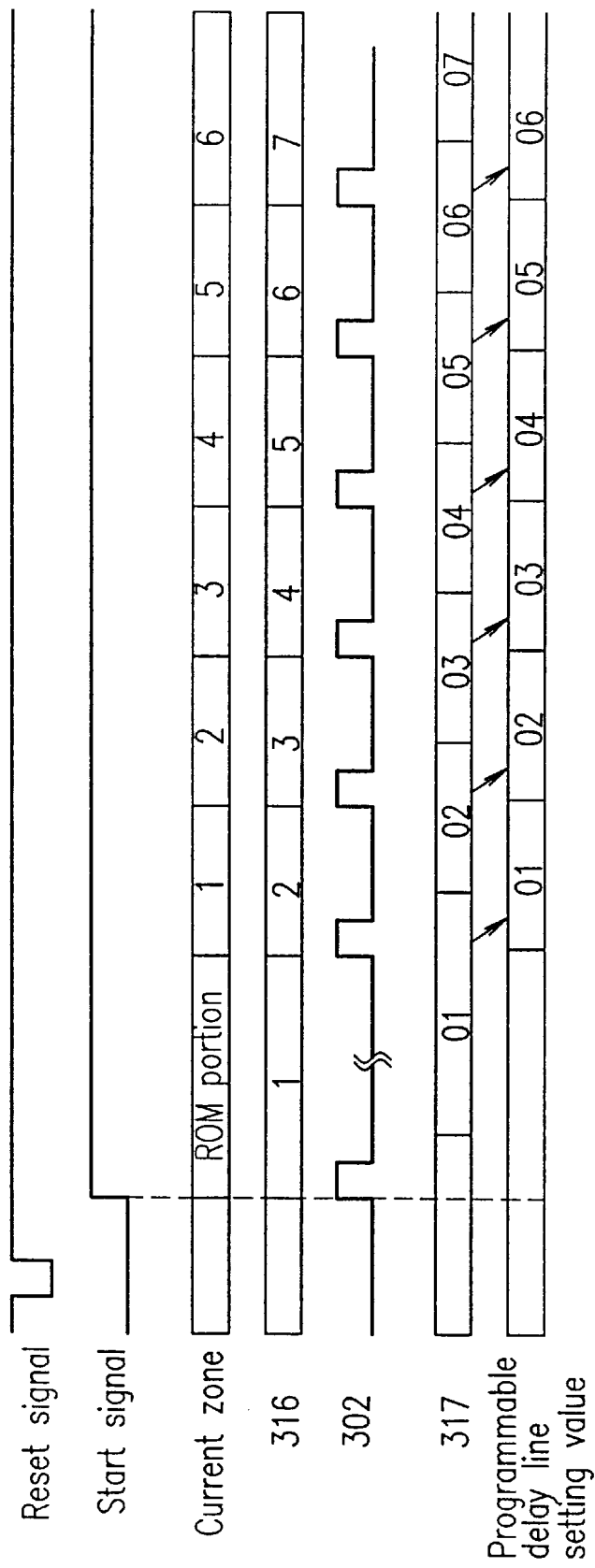
FIG. 17 is a timing diagram illustrating an operation of the duty controller of the disk recording apparatus in the fifth embodiment of the present invention.

FIG. 14 is a timing diagram illustrating a cutting operation of the ROM portion. FIG. 15 is a timing diagram illustrating an operation of the first duty controller 104. FIG. 16 is a timing diagram illustrating a cutting operation of the RAM portion, FIG. 17 is a timing diagram illustrating an operation of the second duty controller 114.

Hereinafter, a cutting operation will be described with reference to FIGS. 13 through 17.

The master disk 60 attached to the spindle motor 74 is rotated by a CAV control, and a ROM portion and a RAM portion are formed on the master disk 60 in the shape of a spiral while the objective lens 73 is transported in a radius direction by a transport system (not shown).

First, the operation of the optical system will be described.

A light beam 201 emitted by the laser light source 61 is split into two light beams 202 and 203 by the light beam splitter 62. The light beam 202 is used for recording pits in the ROM portion, and the light beam 203 is used for recording headers and grooves in the RAM portion. The light beam 202 has its light intensity modulated by the first light modulator 64 based on a laser ON/OFF signal 305 in the ROM portion output from the first controller 65. The light beam 203 is reflected by a mirror 63-1, and has its light intensity modulated by the second light modulator 66 based on a laser ON/OFF signal 308 in the RAM portion output from the second controller 67. A light beam 205 which has its light intensity modulated by the second light modulator 66 and reflected by the mirror 63-2 is deflected by the light beam deflector 68 by a half-track outward when IDa is recorded in the header 31 (FIG. 5) of the RAM portion, deflected by a half-track inward when IDb (FIG. 5) is recorded in the header 31, and sinusoidally wobbles in a radius direction during cutting of grooves. A light beam 204 which has its light intensity modulated by the first light modulator 64 and shaped by the first beam shaping unit 70 and a light beam 206 which is deflected by the light beam deflector 68 and shaped by the second beam shaping unit 71 are combined by the light beam combining unit 72 so as to substantially match each other. The combined light beam is incident upon the objective lens 73 and condensed, thereby irradiating a photoresist of the master disk 60 in a desired format.

Next, the operation of each controller will be described. First, the ROM portion will be described. A signal 301 output from the motor controller 75 in FIG. 14 is one rotation synchronization signal of the spindle motor 74, and this motor makes one turn, for example, with 4096 FG pulses. A signal 302 output from the timing controller 76 is output to the leading edge of the ROM portion once and is output to the leading edges of the RAM portion and each zone once, respectively. A signal 303 output from the P/S converter 103 is a laser ON/OFF signal of the ROM portion before a duty control.

When an instruction to commence cutting is issued by a user, the signal 302 is output in synchronization with the first signal 301. Simultaneously, cutting data previously written in the memory 101 from the SPC 78 through the SCSI interface 77 is read in synchronization with N times of a channel clock of the ROM portion. The P/S converter 103 converts the cutting data (byte data) into serial data with a channel clock from the clock generator 102. Thus, the signal 303 is output, and recording of pits in the ROM portion is started, with sectors of specified addresses being successively recorded. FIG. 15 is a diagram showing the signal 303 in an enlarged state. A signal 304 which is delayed by td from the signal 303 based on a delay amount previously set by the delay line 105, and the AND circuit 106 ANDs the signals 303 and 304, and a signal 305 with a period of "1" (laser ON) shortened is input to the first light modulator 64.

Now, the relationship between the one rotation synchronization signal 301 of the spindle motor 74 and the channel clock of the clock generator 102 will be described.

The disk shown in FIG. 4 has its ROM portion divided into 10 sectors per track. The description will be made in accordance therewith. If the frequency of the clock generator 102 is selected in such a manner that (the number of channel clocks recorded in one sector of the ROM portion)×10 (the number of sectors in one zone)×(one period of clock output from the clock generator 102)=time is equal to a time of one period of the one rotation synchronization signal 301 of the spindle motor 74 or if the frequency of a synthesizer (if it is used) is set, the leading edges of the sectors of the ROM portion can be cut so as to be arranged radially.

For simplicity, the present invention has been described exemplifying the case where the number of sectors in one track of the ROM portion is 10. However, any number of sectors may be used as long as it is an integer.

In order to form the mirror portion where data is not recorded as shown in FIG. 9, a recording signal is not output for 8 tracks of one rotation synchronization signals as shown in FIG. 14. When the mirror portion is completed, cutting of the RAM portion is started. With the completion of the mirror portion, the signal 302 is output again in synchronization with the one rotation synchronization signal 301 at the leading edge of the RAM portion. An operation of the second controller 67 is started upon input of this signal. This operation will be described with reference to FIG. 16.

When the signal 302 is again output in synchronization with the one rotation synchronization signal 301 at the leading edge of the RAM portion, cutting data of the header portion in the RAM portion previously written in the memory 112 from the SPC 78 through the SCSI interface 77 is read in synchronization with N times the channel clock of the first zone in the RAM portion. The P/S converter 113 converts the cutting data (byte data) into serial data with the channel clock of the first zone in the RAM portion output from the programmable synthesizer 111. Thus, the signal 307 is output. Recording of the header portion in the RAM portion is started, with the sectors of the specified addresses being successively recorded. FIG. 16 also shows an enlarged signal 307 and an enlarged signal 308. A signal 309 is output, which is delayed by td from the signal 307 based on a delay amount corresponding to the first zone set in accordance with the method described later by the programmable delay line 117, and the AND 118 "ANDS" the signals 307 and 309, whereby a signal with a period with "1" (laser ON) reduced is input to the header portion amplitude adjuster 115. The header portion amplitude adjuster 115 is controlled by the signal 310 which becomes "0" only in a header formed by the light beam deflections controller 69 in an operation described later, and generates a signal with an amplitude reduced only when the signal 310 is "0". Simultaneously, the header portion amplitude adjuster 115 "ORs" the signal thus generated and the signal 306 which becomes "1" (laser ON) in a groove portion input from the timing controller 76. The signal 308 (enlarged) which is subjected to the duty control and amplitude adjustment in the header portion and becomes "1" in the groove portion is input to the second light modulator 66 and has its light intensity modulated with its duty and amplitude, whereby the header portion and the groove portion are cut.

Here, operations performed by the programmable synthesizer 111 and the second duty controller 114 in accordance with each zone when zones are switched in this RAM portion will be described with reference to FIG. 17. The programmable synthesizer 111 and the second duty controller 114 receive, from the timing controller 76, a signal 316 showing a zone which comes next based on a zone being currently cut and the signal 302 output at the leading edge of each zone. The programmable delay line 117 receives, from the ROM portion 116, delay amount setting data of the zone which comes next indicated by the signal 316 among data of the previously set delay amount corresponding to each zone. The delay amount setting data is set in the programmable delay line 117 with the signal 302 input at the leading edge of the next zone. The programmable synthesizer 111 operates in the same way. The programmable synthesizer 111 has two transmission sources. One transmission source outputs a channel clock which is currently being cut, and the other transmission source generates a channel clock of the next zone with the signal 316 indicating a zone which comes next. These two transmission sources are switched with the signal 302 output at the leading edge of the next zone, whereby a channel clock corresponding to each zone can be output at all times.

A zone is switched to a next zone, for example, by counting the one rotation synchronization signal 301, of the spindle motor 74 by 1888 for one zone. According to the disk of the present invention, the count value is the same in any zone, so that the counter can be simply constructed.

On the other hand, simultaneously, the light beam deflection controller 69 receives the signal 306 resetting the wobble counter 121, the signal 311 which becomes "1" only in IDa (FIG. 5), and the signal 312 which, becomes "1" only in IDb (FIG. 5) from the timing controller 76. The differential amplifier 124 differentiates the signals 311 and 312, thereby outputting a signal 313 which is set to be lower than the mean value only in IDa of the header portion and higher than the mean value only in IDb of the header portion, with the difference in electric potential between the mean value and the value in IDa and the difference in electric potential between the mean value and the value in IDb being almost equal to each other. Furthermore, when the wobble counter 121 is reset by the signal 306 which becomes "1" only in the groove portion, and a groove is started, the wobble counter 121 is counted up with a channel clock of the RAM portion input from the programmable synthesizer 111, and the wobble counter 121 is reset by a 186 channel bit period, and periodically counted in circulation. The count signal is input to the wobble ROM 122, data in the form of a sinusoidal wave is output as digital data, and the digital data is digital/analog converted by the D/A converter 123 to output a wobble signal 314 which has a sinusoidal wave only in the groove portion. Furthermore, an offset voltage of the signal 314 is adjusted to an electric potential of the mean value of the signal 313. The signal 310 which becomes "0" only in the header portion generated by the NOT circuits 125 and 126 and the AND circuit 127 controls the selector 128, and the selector 128 selects the signal 313 for the header portion and the signal 314 for the groove portion and inputs the signal 315 to the light beam deflector 68. The light beam deflector 68 deflects a beam to an outer track side by a half track during IDa in which an electric potential lower than the mean value is input, and deflects a beam to an inner track by a half track during IDb in which an electric potential higher than the mean value is input. The light beam deflector 68 deflects a beam sinusoidally during the groove portion. Thus, the header portion and the groove portion in the RAM portion are cut.

As shown in FIG. 16, a recording signal is not output from a land portion in the RAM portion, the spindle motor 74 is rotated only by one track, and the objective lens 73 is sent to an outer track by one track.

In the disk shown in FIG. 4, the first zone in the RAM portion is divided into 9 sectors per track. Therefore, the description will be made in accordance therewith. If the frequency of the programmable synthesizer 111 is set so as to generate a channel clock which allows (the number of channel clocks recorded in one sector of the ROM portion)×9 (the number of sectors in, one zone in the RAM portion))×(one period of a clock actually output from the programmable synthesizer 111)=time to be equal to one period of time of the one rotation synchronization signal 301 of the spindle motor 74, the leading edges of the sectors of the first zone in the RAM portion are out so as to be arranged radially at all times. The leading edges of the sectors in each zone of the RAM portion are cut so as to be radially arranged at all times from the second zone to the lead-out in the similar operation.

Furthermore, since a sector address of the first sector in one track of the ROM portion or a header of the first sector in one track of the RAM portion is recorded in synchronization with the one rotation synchronization signal 301 of the spindle motor 74, the ROM portion and the RAM portion can be easily cut so that the leading edges of the sectors are aligned without fail once in one track.

For simplicity, the present invention has been described exemplifying the case where the number of sectors in one track in the first zone of the RAM portion is 9. However, any number of sectors may be used as long as it is an integer.

By operating as described above, the disk in the second embodiment can be cut. Here, the necessity for performing a duty ratio correction and for independently subjecting the header portions in the ROM portion and the RAM portion to a duty ratio correction will be described.

FIG. 18 is a timing diagram illustrating the necessity for a duty ratio correction. (a) represents pits desired to be recorded, (b) represents a recording pulse before a duty ratio correction for obtaining the desired pits (a), (c) represents laser spots of a recording laser, (d) represents pits obtained before and after a duty ratio correction, where shaded portions represent pits obtained by a recording pulse before a duty ratio correction, and white portions represent pits obtained by a recording pulse after a duty ratio correction. (e) represents a recording pulse after a duty ratio correction, with a shaded portion representing a cut-away pulse. As is understood from the drawings, in order to obtain the pits (a) with a desired size, since the spots (c) of a recording laser have a limited size, pits larger than the given recording pulse (b), i.e., pits (d) represented by the shaded portions are formed. Thus, in order to obtain pits with a desired size, recording should be performed with the recording pulse (e) which is previously subjected to a duty ratio correction.

Figure 19:
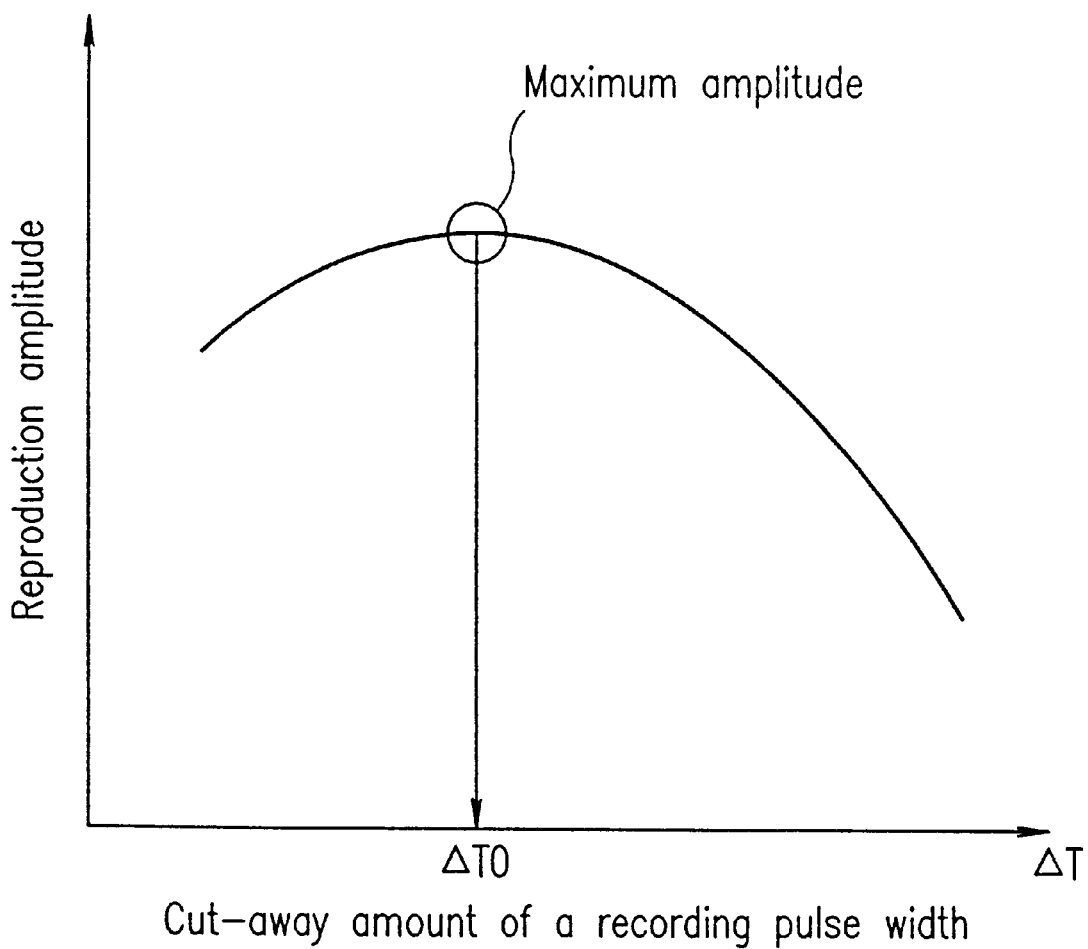
FIG. 19 is a graph showing the relationship between the recording pulse out-away amount and the reproduction amplitude.

A method for obtaining a recording pulse with a desired width will be described. FIG. 19 is a graph showing the relationship between the cut-away amount of a recording pulse width and the amplitude of a shortest pit during reproduction. As shown in FIG. 19, the amplitude during reproduction does not become best when the cut-away amount of a recording pulse width is too much or too little. When recording is performed with the cut-away amount of a recording pulse width which maximizes the amplitude, a signal with the best S/N can be obtained during reproduction. The necessity for a duty ratio correction and a method thereof has been described.

Hereinafter, the necessity for performing a duty ratio correction in the ROM portion and the RAM portion independently will be described. In the present embodiment, the ROM portion and the RAM portion are cut by respective light beams. Needless to say, there is a difference in diameter between a light beam for cutting only pits and a light beam for cutting grooves and pits. Thus, the best conditions for the cut-away amount of a recording pulse described above are different therebetween. Furthermore, in the present embodiment, cutting is performed by subjecting the spindle motor 74 to a CAV control, a pulse width for recording pits having the same size becomes shorter on an outer track than on an inner track. Therefore, the cut-away amount of a recording pulse width should be switched by a constant relationship in each zone. In this respect, it is required that the duty ratio correction be made in the ROM portion and the RAM portion independently. Furthermore, it is required that the duty ratio correction be made between the zones in the RAM portion.

As described above, the same light beam is used for cutting grooves and pits in the RAM portion in the present embodiment. For the same reason as that for the necessity of the duty ratio correction, the width of the groove and that of the pit which become best during reproduction are different. In the case of the grooves and the pits, the power of the light beam radiated to the master disk 60 is switched by changing the amplitude by the second light modulator 66, whereby the grooves and the pits are controlled so as to become best during reproduction.

As described above, the disk of the second embodiment can be cut. Furthermore, the disk of the third embodiment can be easily cut by allowing the clock generator 102 of the first controller 65 to switch clocks in accordance with each zone, as in the programmable synthesizer of the second controller. The disk of the fourth embodiment can be easily cut by controlling the clock generator 102, and allowing recording data in the same format as that in the second and third embodiments to be written in the memory 101 through the SCSI interface in the backup data portion of the ROM portion and recording data in the same format as that of the RAM portion of the second embodiment to be written in the memory 101 through the SCSI interface in the user data portion.

Embodiment 6

Figure 20:
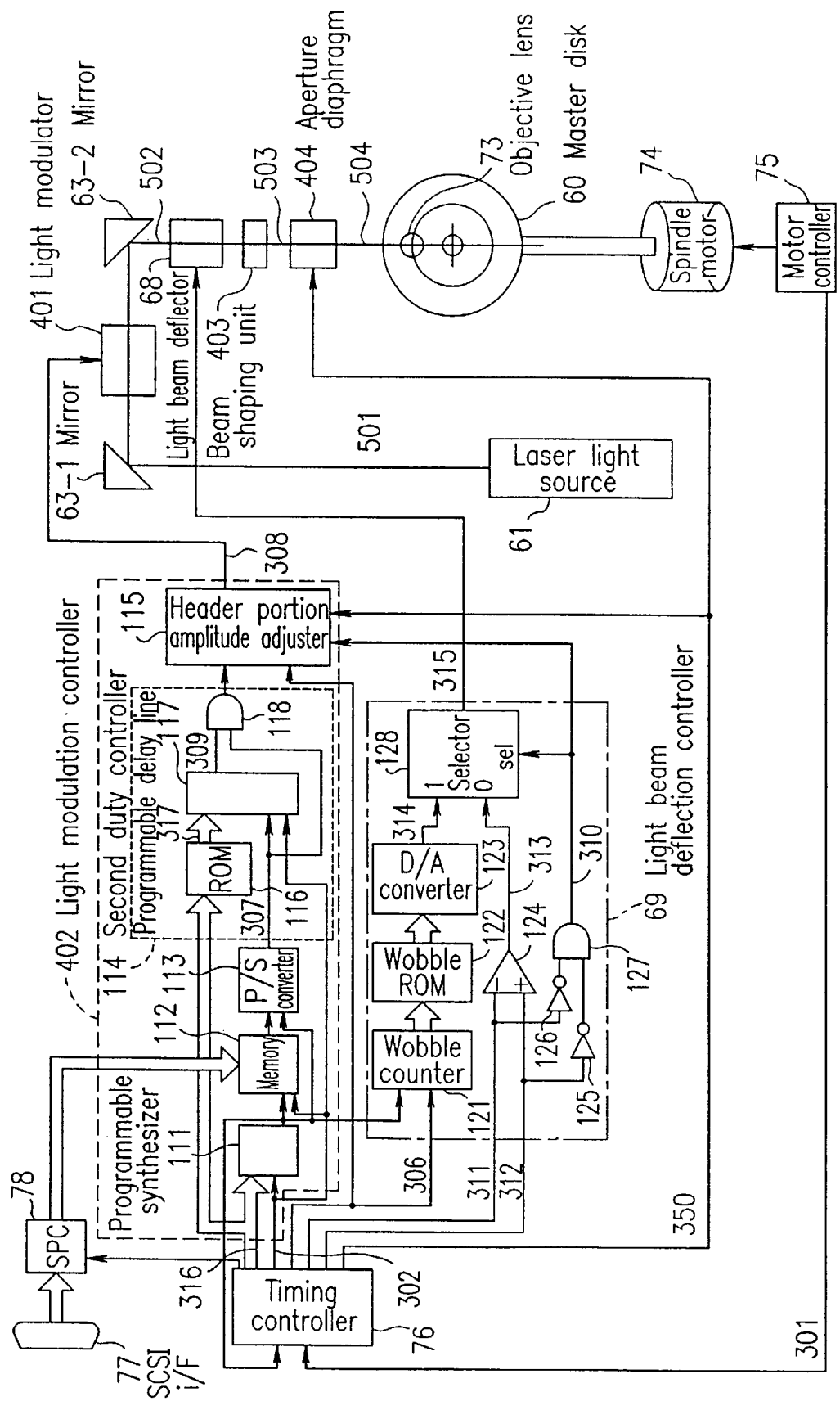
FIG. 20 is a block diagram showing a disk recording apparatus in the sixth embodiment of the present invention.

FIG. 20 is a block diagram showing a disk recording apparatus of the sixth embodiment of the present invention. The disk recording apparatus is used for recording data onto a master of the optical disk described in the second embodiment. In FIG. 20, the elements similar to those in FIG. 13 are denoted by the reference numerals similar to those therein. The description thereof will be omitted.

In FIG. 20, reference numeral 401 denotes a light modulator for modulating a light beam which forms pits in a ROM portion and grooves and headers in a RAM portion, 402 denotes a light modulation controller for controlling the light modulator 401 based on recording data to be input, 403 denotes a beam shaping unit for shaping a light beam from the light beam deflector 68, and 404 denotes an aperture diaphragm for switching the aperture limit of a light beam passed through the beam shaping unit 40 between the ROM portion and the RAM portion. The light modulation controller 402 has the same structure as that of the second controller in the fifth embodiment.

First, the operation of the optical system will be described.

A light beam 501 emitted by a laser light source 61 is reflected by a mirror 63-1 and has its light intensity modulated by the light modulator 401 based on a laser ON/OFF signal 308 in the ROM portion and the RAM portion output from the light modulator 402. A light beam 502 which has its light intensity modulated by the light modulator 401 and is reflected by a mirror 63-2 is deflected to an outer track by a half track by the light beam deflector 68 when IDa is recorded in a header in the RAM portion, deflected to an inner track by a half track when IDb is recorded in the header, and sinusoidally wobbles in a radius direction during cutting of grooves, based on a signal 315 output from the light beam deflection controller 69. A light beam 503 which is deflected by the light beam deflector 68 and shaped by the beam shaping unit 403 is controlled so that a light beam with a larger spot diameter is formed in the RAM portion by prescribing a ratio of an aperture limit to be larger in the RAM portion than in the ROM portion by the aperture diaphragm 404 with a signal 350 output from a timing controller 76. A light beam 504 which has its aperture limit switched between the ROM portion and the RAM portion is incident upon an objective lens 73 and condensed to irradiate a photoresist of a master disk 60 in a desired format.

Next, the operation of each controller will be described, with only the operations different from those of the fifth embodiment being described in detail.

In the fifth embodiment different light beams are used for cutting the ROM portion and the RAM portion, so that there are two light modulators and two light modulation controllers. However, in the present embodiment, one light beam is used for cutting the ROM portion and the RAM portion, so that one light modulator 401 and one light modulation controller 402 are used for controlling the light modulation of the ROM portion and the RAM portion. As described above, the configuration of the light modulation controller 402 is the same as that of the second controller shown in FIG. 13. Only the operation in the case of the ROM portion will be described.

Figure 21:
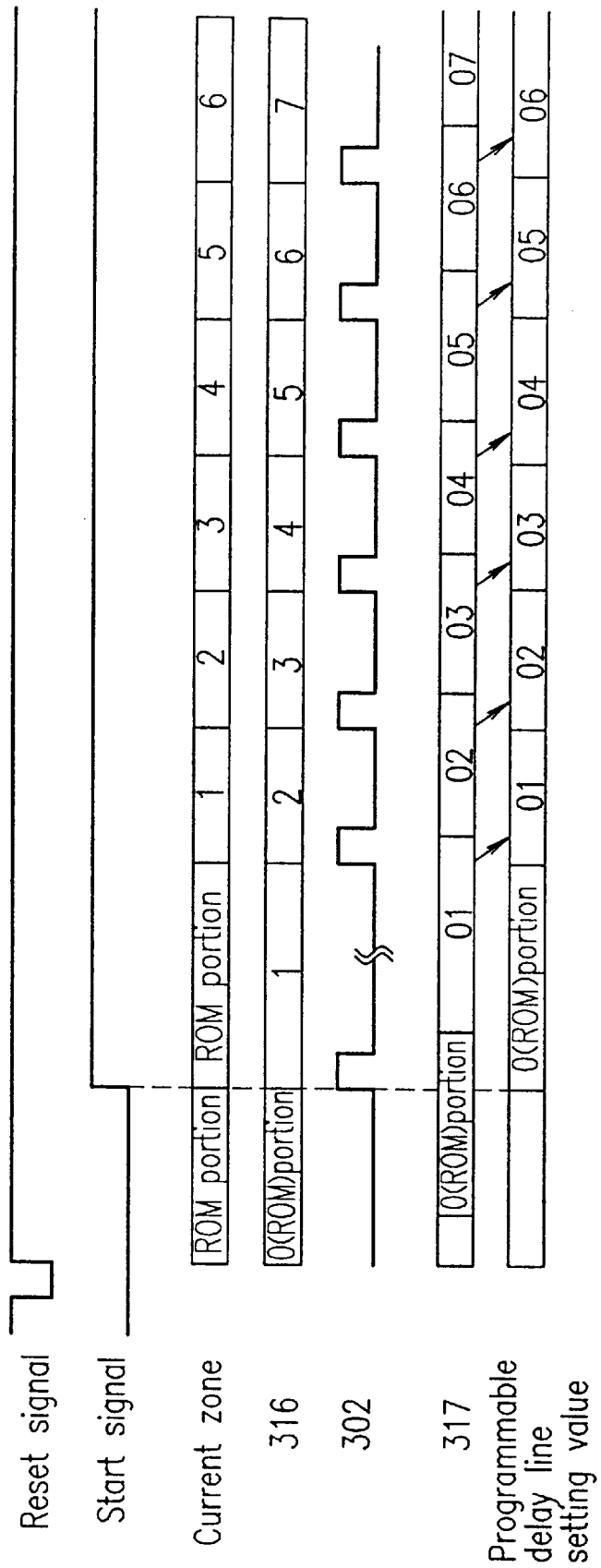
FIG. 21 is a timing diagram illustrating an operation of a duty controller of the disk recording apparatus in the sixth embodiment of the present invention.

In the ROM portion, when an instruction to commence cutting is issued by a user, a signal 302 is output in synchronization with the rise of a first signal 301. Simultaneously, cutting data in the ROM portion previously written in a memory 112 from an SPC 78 through an SCSI interface 77 is read in synchronization with N times of a channel clock in the ROM portion. The P/S converter 113 converts the cutting data (byte data) into serial data with a channel clock in the programmable synthesizer 111, whereby a signal 207 is output. Recording in the ROM portion is started, and recording is successively performed from a sector at a specified address. In the fifth embodiment, the signal 307 only outputs cutting data in the header portion of the RAM portion. However, in the present embodiment, the signal 307 is controlled by the timing controller 76 so as to output cutting data in the ROM portion of the signal 303 shown in FIG. 14. FIG. 21 shows a timing diagram illustrating an operation of the duty controller 114 in the present embodiment. As is understood from FIG. 21, an address containing data of a delay amount of the ROM portion is input to the ROM 116 together with an input of a reset signal from the timing controller 76. A delay amount corresponding to the ROM portion is input to the programmable delay line 117 from the ROM 116 and set at the first rise of the signal 302. At this time, the programmable synthesizer 111 is controlled by the timing controller 76 so as to output a channel clock corresponding to the ROM portion in the same operation.

A signal 309 which is delayed by td from a signal 307 based on a delay amount corresponding to the ROM portion set by the programmable delay line 117 is output, and the signals 307 and 309 are ANDed by the AND circuit 118, whereby a signal 308 with a period of "1" (laser ON) reduced is input to the light modulator 401 and modulate a light beam 501. The control of the RAM portion of the light modulator 401 thereafter is the same as that of the fifth embodiment.

In the same way as in the fifth embodiment, the ROM portion shown in FIG. 4 is divided into 10 sectors per track. The description will be made in accordance therewith. If the frequency of the programmable synthesizer 111 is set so as to generate a channel clock which allows (the number of channel clocks)×10 (the number of sectors In one zone in the ROM portion))×(one period of a clock output actually output from the programmable synthesizer 111)=time to be equal to a time in one period of the one rotation synchronization signal 301 of the spindle motor 74, the leading edges of the sectors in the ROM portion are cut so as to be radially arranged at all times.

Next, the operation of the aperture diaphragm 404 will be described.

The aperture diaphragm 404 receives a signal 350 which becomes "0" in the ROM portion and "1" in the RAM portion generated by the timing controller 76 utilizing the rise of the signal 302 output at the leading edge of the RM portion. Upon receiving the signal 350, the aperture diaphragm 404 is operated so that a ratio of the aperture limit becomes small at "0" (aperture portion is larger compared with the RAM portion), and a ratio of the aperture limit becomes large at "1" (aperture portion is smaller compared with the ROM). A narrowed light beam is input to the objective lens 73 in the ROM portion and a light beam slightly larger than that in the ROM portion is input to the objective lens 73 in the RAM portion, and these light beams are controlled so that characteristics such as a jitter or a tilt margin during reproduction become best. Furthermore, in conjunction with this, the header portion amplitude adjuster 115 inputs the signal 350 to the light modulator 401, making the amplitude of a recording signal smaller than that of a recording signal for cutting a header portion of the RAM portion when the signal 350 is "0", and making an amplitude of a recording signal for cutting a header portion smaller than that of a recording signal for cutting a groove in the same way as in the fifth embodiment when the signal 350 is "1". The aperture limit is switched and light intensity is modulated, whereby characteristics such as a jitter or a tilt margin are optimized. The amplitude control of the recording signal is required for the following reason. When an aperture portion is made smaller, light transmittance becomes low. The recording power becomes smaller by an aperture limit at the time of recording in the RAM portion, requiring a recording power larger than that in the ROM portion. In order to compensate for this, the amplitude control is provided.

As described above, the disk in the second embodiment can be cut. Furthermore, the disk of the third embodiment can be easily cut by allowing the programmable synthesizer 111 of the light modulation controller 402 to switch clocks in accordance with each zone. The disk of the fourth embodiment can be easily cut by controlling the programmable synthesizer 111, and allowing recording data in the same format as that in the second and third embodiments to be written in the memory 112 through the SCSI interface in the backup data portion of the ROM portion and recording data in the same format as that of the RAM portion of the second embodiment to be written in the memory 112 through the SCSI interface in the user data portion.

According to the sixth embodiment, in addition to the effect of the fifth embodiment, there is an advantage in that the optical disk in the second embodiment can be cut by a simple optical system.

As is apparent from the above description, in the disk of the present invention, the number of sectors included in one track in a boundary area between the ROM portion (first memory area) and the RAM portion (second memory area) is larger in the ROM portion than in the RAM portion, and the leading edges of the sectors in the ROM portion are arranged at least in a line in a radius direction. Therefore, the disk rise time is shortened, and a larger capacity of ROM portion can be provided.

Furthermore, the RAM portion is divided into zones, the number of tracks contained in each zone in the data region of the RAM portion is almost equal to each other, and the leading edges of the sectors in the ROM portion are radially arranged. Therefore, the disk rise time is shortened, and a larger capacity of ROM portion can be provided. Furthermore, since the number of tracks contained in each zone in the data region is almost equal to each other, the seek zone is easily found, the motor rotation control can be made faster, and the structure of the recording apparatus during cutting can be made simplified.

Furthermore, since at least one leading edge of a sector on one track in the ROM portion is aligned with at least one leading edge of a sector on one track in the RAM portion in a radius direction, an address can be stably read when seeking is performed in the RAM portion.

Furthermore, the ROM portion is composed of a backup data portion and a user data portion. All the leading edges of the sectors in the backup data portion are radially arranged. The user data portion is divided into zones. All the leading edges of the sectors in each zone are radially arranged, and all the leading edges of the sectors in each zone in the RAM portion are radially arranged. The number of tracks contained in each zone in the ROM portion and the RAM portion is almost equal to each other. Therefore, the contents or the like of a format of a DVD-ROM can be recorded in the ROM portion, whereby a disk with high added values can be obtained.

Regardless of the allocation of the number of zones in the ROM portion and in the RAM portion, the address of a leading sector in each zone is always the same. Therefore, data can be easily managed.

Since information for a boundary area between the ROM portion and the RAM portion is recorded in the backup data portion, focusing, tracking, and switching of gains or the like can be smoothly performed.

Furthermore, the disk recording apparatus of the present invention has a structure in which the first controller for controlling the modulator of a light beam cutting the ROM portion generates the recording signal so that the leading edges of the sectors in the ROM portion are radially arranged, and the first light modulator is controlled by the recording signal. Therefore, the disk boot-up time is shortened, and the disk can be cut so as to have a larger capacity of ROM portion and RAM portion.

The recording power of a light beam can be controlled to be smaller in recording pits containing address information than in recording grooves in the RAM portion. Therefore, grooves and pits can be cut into a disk so as to have optimum characteristics for recording/reproducing data by a drive.

The ON/OFF duty ratio of recording data to be input is controlled in the ROM portion and the RAM portion, independently. Therefore, a disk can be cut so as to have characteristics optimum for recording/reproducing data in the ROM portion and the RAM portion by a drive.

The ON/OFF duty ratio of recording data to be input when the ROM portion is divided into a backup data portion and a user data portion is controlled in each zone, and the ON/OFF duty ratio of recording data to be always input in the RAM portion is controlled in each zone. Therefore, a disk can be cut so as to have characteristics optimum for recording and reproducing data in any zone of the ROM portion and the RAM portion by a drive.

Furthermore, in the disk recording apparatus of the present invention, an aperture limit is switched between cutting the ROM portion and the RAM portion with one kind of beam. In the case of cutting the ROM portion, the light modulation controller generates a recording signal so that the leading edges of the sectors in the ROM portion are radially arranged, and the light modulator is controlled by the recording signal. Therefore, the boot-up time of the disk can be shortened, and a disk having a large capacity of ROM portion and RAM portion can be cut in a simplified configuration.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A disk comprising:
   a read-only storage area for reproducing data; and
   a read-write storage area for recording and reproducing data, the read-write storage area being close to the read-only storage area,
   wherein the number of sectors in each track of the read-only storage area and the read-write storage area close to each other is larger in the read-only storage area than in the read-write storage area, and
   leading edges of the sectors in each track of the read-only storage area are aligned in at least one line.

2. A disk according to claim 1, wherein the leading edge of each sector in the read-only storage area and the leading edge of each sector in the read-write second storage area are aligned in at least one line in a radius direction.

3. A disk according to claim 1, wherein a portion in which data is not recorded is placed between the read-only storage area and the read-write storage area.

4. A disk according to claim 1, wherein addresses are continuously provided to the read-only and read-write storage areas.

5. A disk according to claim 1, wherein information indicating a boundary position between the read-only storage area and the read-write storage area is recorded in a backup data portion in the read-only storage area.

6. A disk according to claim 1, where in the read-only storage area is located radially inward of the read-write storage area.

7. A disk comprising:
   a read-only storage area for reproducing data; and
   a read-write storage area for recording and reproducing data,
   wherein the read-write storage area is divided into a plurality of zones, and the number of sectors in each zone on an inner side of the disk is smaller than on an outer side, and
   leading edges of sectors in each track in the read-only storage area are radially arranged.

8. A disk according to claim 7, wherein the number of tracks in each zone in the write-only storage area is equal to each other.

9. A disk according to claim 7, wherein the leading edge of each sector in the read-only storage area and the leading edge of each sector in the read-write storage area are aligned in at least one line in a radius direction.

10. A disk according to claim 7, wherein a portion in which data is not recorded is placed between the read-only storage area and the read-write storage area.

11. A disk according to claim 7, where in addresses area continuously provided to the read-only and read-only storage areas.

12. A disk according to claim 7, wherein information indicating a boundary position between the read-only storage area and the read-write storage area is recorded in a backup data portion in the read-only storage area.

13. A disk according to claim 7, wherein the read-only storage area includes a backup data portion and a user data portion, all leading edges of the respective sectors are radially arranged in the backup data portion, the user data portion is divided into a plurality of zones, and the leading edges of the respective sectors are radially arranged in each zone of the user data portion, the read-write storage area is divided into a plurality of zones, and the leading edges of the respective sectors are radially arranged in each zone of the read-write storage area, and the number of tracks in each zone of the read-only and read-write storage areas is equal to each other.

14. A disk according to claim 7, wherein an address of a leading sector in each zone is determined in accordance with a position in a radius direction of the leading sector.

* * * * *